US009152307B2

(12) United States Patent
Coleman et al.

(10) Patent No.: US 9,152,307 B2
(45) Date of Patent: Oct. 6, 2015

(54) SYSTEMS AND METHODS FOR SIMULTANEOUSLY DISPLAYING CLUSTERED, IN-LINE ELECTRONIC MESSAGES IN ONE DISPLAY

(71) Applicant: Google Inc., Mountain View, CA (US)

(72) Inventors: Keith Coleman, Palo Alto, CA (US); Rob Young, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/183,421

(22) Filed: Feb. 18, 2014

(65) Prior Publication Data
US 2015/0186012 A1 Jul. 2, 2015

Related U.S. Application Data

(60) Provisional application No. 61/922,728, filed on Dec. 31, 2013.

(51) Int. Cl.
*G06F 3/048* (2013.01)
*G06F 3/0484* (2013.01)
*H04L 12/58* (2006.01)

(52) U.S. Cl.
CPC ............ *G06F 3/04842* (2013.01); *H04L 51/04* (2013.01)

(58) Field of Classification Search
CPC ..... G06Q 10/107; G06F 3/048; G06F 3/0482; G06F 2221/2149; G06F 2201/86; G06F 17/30578; G06F 17/3089; H04L 51/00; H04L 51/22; H04L 67/22
See application file for complete search history.

(56) References Cited

U.S. PATENT DOCUMENTS

| 4,914,650 | A | 4/1990 | Sriram |
| 5,948,040 | A | 9/1999 | DeLorme et al. |
| 6,044,260 | A | 3/2000 | Eaton et al. |
| 6,057,841 | A | 5/2000 | Thurlow et al. |
| 6,147,977 | A | 11/2000 | Thro et al. |
| 6,232,972 | B1 | 5/2001 | Arcuri et al. |
| 6,252,597 | B1 * | 6/2001 | Lokuge ......................... 715/841 |
| 6,333,973 | B1 | 12/2001 | Smith et al. |
| 6,351,764 | B1 | 2/2002 | Voticky et al. |
| 6,421,709 | B1 | 7/2002 | McCormick et al. |
| 6,507,866 | B1 | 1/2003 | Barchi |
| 6,700,591 | B1 | 3/2004 | Sharpe |
| 6,704,772 | B1 | 3/2004 | Ahmed et al. |
| 6,725,228 | B1 | 4/2004 | Clark et al. |
| 6,778,642 | B1 | 8/2004 | Schmidt, Jr. et al. |

(Continued)

*Primary Examiner* — Jennifer To
*Assistant Examiner* — Terri Filosi
(74) *Attorney, Agent, or Firm* — Morgan, Lewis & Bockius LLP

(57) ABSTRACT

Systems and methods for displaying electronic messages are disclosed. In some implementations, a method includes, at a computing device, displaying a user interface for a messaging application, comprising an electronic message list. The message list comprises a plurality of objects. Each respective object in the plurality of objects is visually distinct in the message list and represents one or more corresponding electronic messages. The method includes detecting user selection of an object in the message list and in response to detecting user selection of the object, toggling display of the first object from a first state to a second state. The method includes moving a first subset of objects vertically upward, where the first subset of objects comprises one or more objects above the selected object, and moving a second subset of objects vertically downward, where the second subset of objects comprises one or more objects below the selected object.

17 Claims, 26 Drawing Sheets

(56) References Cited

U.S. PATENT DOCUMENTS

| | | |
|---|---|---|
| 6,961,341 B1 | 11/2005 | Krishnan |
| 7,120,865 B1 | 10/2006 | Horvitz et al. |
| 7,167,910 B2 | 1/2007 | Farnham et al. |
| 7,194,516 B2 | 3/2007 | Giacobbe et al. |
| 7,359,947 B2 | 4/2008 | Kelley et al. |
| 7,415,504 B2 | 8/2008 | Schiavone et al. |
| 7,421,690 B2 | 9/2008 | Forstall et al. |
| 7,429,993 B2 * | 9/2008 | Hui ............................... 345/629 |
| 7,475,120 B1 | 1/2009 | Ngo et al. |
| 7,506,263 B1 | 3/2009 | Johnston et al. |
| 7,536,652 B2 | 5/2009 | Uemura et al. |
| 7,539,732 B2 | 5/2009 | Kelso et al. |
| 7,568,011 B2 | 7/2009 | Bocking et al. |
| 7,689,656 B2 | 3/2010 | McCarthy et al. |
| 7,730,137 B1 | 6/2010 | Toomey |
| 7,765,212 B2 | 7/2010 | Surendran et al. |
| 7,788,329 B2 | 8/2010 | Barrett et al. |
| 7,814,155 B2 | 10/2010 | Buchheit et al. |
| 7,895,279 B2 * | 2/2011 | Forstall et al. ................. 709/206 |
| 7,895,537 B2 | 2/2011 | Gruen et al. |
| 7,958,099 B2 | 6/2011 | Kang et al. |
| 7,979,501 B1 | 7/2011 | Coleman et al. |
| 7,996,900 B2 | 8/2011 | Gillum et al. |
| 8,010,613 B2 | 8/2011 | Oral et al. |
| 8,031,845 B2 | 10/2011 | Gruen et al. |
| 8,041,745 B2 | 10/2011 | Newton et al. |
| 8,065,369 B2 | 11/2011 | Turski et al. |
| 8,095,400 B2 | 1/2012 | Herde et al. |
| 8,108,469 B2 | 1/2012 | Kent, Jr. et al. |
| 8,140,703 B2 | 3/2012 | Morris et al. |
| 8,150,926 B2 | 4/2012 | Sundararajan et al. |
| 8,150,930 B2 | 4/2012 | Satterfield et al. |
| 8,176,130 B2 | 5/2012 | Daniell |
| 8,224,902 B1 | 7/2012 | Glasser et al. |
| 8,230,350 B2 | 7/2012 | Dodsworth |
| 8,233,885 B2 | 7/2012 | Kansal et al. |
| 8,239,874 B2 | 8/2012 | Anderson et al. |
| 8,281,382 B1 | 10/2012 | Sanyal et al. |
| 8,286,089 B2 | 10/2012 | Hardy et al. |
| 8,307,029 B2 | 11/2012 | Davis et al. |
| 8,375,307 B2 | 2/2013 | Kim |
| 8,375,400 B2 | 2/2013 | Sutedja et al. |
| 8,402,096 B2 | 3/2013 | Affronti et al. |
| 8,448,084 B2 | 5/2013 | Brichter |
| 8,499,042 B2 | 7/2013 | Brown et al. |
| 8,499,048 B2 | 7/2013 | Malik et al. |
| 8,533,274 B2 | 9/2013 | Buchheit et al. |
| 8,560,619 B1 | 10/2013 | Huston et al. |
| 8,572,277 B2 | 10/2013 | Morris et al. |
| 8,577,967 B1 | 11/2013 | Chavez et al. |
| 8,583,747 B2 | 11/2013 | Buchheit et al. |
| 8,626,851 B2 | 1/2014 | Buchheit et al. |
| 8,656,289 B1 | 2/2014 | Dodsworth |
| 8,701,018 B1 | 4/2014 | Keel et al. |
| 2002/0143871 A1 | 10/2002 | Meyer et al. |
| 2002/0160757 A1 | 10/2002 | Shavit et al. |
| 2003/0020749 A1 | 1/2003 | Abu-Hakima et al. |
| 2003/0154212 A1 | 8/2003 | Schirmer et al. |
| 2003/0177190 A1 | 9/2003 | Moody et al. |
| 2003/0195811 A1 | 10/2003 | Hayes, Jr. et al. |
| 2003/0214534 A1 | 11/2003 | Uemura et al. |
| 2003/0233419 A1 | 12/2003 | Beringer |
| 2004/0078190 A1 | 4/2004 | Fass et al. |
| 2004/0153456 A1 | 8/2004 | Charnock et al. |
| 2004/0254998 A1 | 12/2004 | Horvitz |
| 2005/0004990 A1 | 1/2005 | Durazo et al. |
| 2005/0018819 A1 | 1/2005 | Schmidt, Jr. et al. |
| 2005/0080851 A1 | 4/2005 | Kent, Jr. et al. |
| 2005/0080862 A1 | 4/2005 | Kent, Jr. et al. |
| 2005/0102366 A1 | 5/2005 | Kirsch |
| 2005/0114781 A1 | 5/2005 | Brownholtz et al. |
| 2005/0138552 A1 | 6/2005 | Venolia |
| 2005/0193076 A1 | 9/2005 | Flury et al. |
| 2005/0193345 A1 | 9/2005 | Klassen et al. |
| 2005/0246658 A1 | 11/2005 | Uemura et al. |
| 2005/0256968 A1 | 11/2005 | Johnson |
| 2006/0010215 A1 | 1/2006 | Clegg et al. |
| 2006/0031340 A1 | 2/2006 | Mathew et al. |
| 2006/0031347 A1 | 2/2006 | Sahi |
| 2006/0059238 A1 | 3/2006 | Slater et al. |
| 2006/0064410 A1 | 3/2006 | Razza et al. |
| 2006/0069734 A1 | 3/2006 | Gersh et al. |
| 2006/0075044 A1 | 4/2006 | Fox et al. |
| 2006/0095466 A1 | 5/2006 | Stevens et al. |
| 2006/0123360 A1 * | 6/2006 | Anwar et al. .................. 715/810 |
| 2006/0173824 A1 | 8/2006 | Bensky et al. |
| 2006/0173961 A1 | 8/2006 | Turski et al. |
| 2006/0206495 A1 | 9/2006 | Van Gageldonk et al. |
| 2007/0005592 A1 | 1/2007 | Kender et al. |
| 2007/0106729 A1 | 5/2007 | Adams et al. |
| 2007/0262861 A1 | 11/2007 | Anderson et al. |
| 2007/0277113 A1 | 11/2007 | Agrawal et al. |
| 2007/0299923 A1 | 12/2007 | Skelly et al. |
| 2010/0030798 A1 | 2/2010 | Kumar et al. |
| 2010/0049806 A1 | 2/2010 | Haynes et al. |
| 2010/0114855 A1 | 5/2010 | Li et al. |
| 2010/0199180 A1 | 8/2010 | Brichter |
| 2010/0262922 A1 | 10/2010 | Fan et al. |
| 2010/0278453 A1 | 11/2010 | King |
| 2011/0010182 A1 | 1/2011 | Turski et al. |
| 2011/0072363 A1 | 3/2011 | Mandel et al. |
| 2011/0231499 A1 | 9/2011 | Stovicek et al. |
| 2012/0102037 A1 | 4/2012 | Ozonat |
| 2012/0131095 A1 | 5/2012 | Luna et al. |
| 2012/0180021 A1 | 7/2012 | Byrd et al. |
| 2012/0198053 A1 | 8/2012 | Ozhan et al. |
| 2012/0210334 A1 | 8/2012 | Sutedja et al. |
| 2012/0271908 A1 | 10/2012 | Luna et al. |
| 2012/0272160 A1 | 10/2012 | Spivack et al. |
| 2013/0024440 A1 | 1/2013 | Dimassimo et al. |
| 2013/0055099 A1 | 2/2013 | Yao et al. |
| 2013/0055105 A1 | 2/2013 | Spierer |
| 2013/0110953 A1 | 5/2013 | Sutedja et al. |
| 2013/0159879 A1 | 6/2013 | Affronti et al. |
| 2013/0165165 A1 | 6/2013 | Macek et al. |
| 2013/0166280 A1 | 6/2013 | Quast et al. |
| 2013/0212189 A1 | 8/2013 | Velissarakos |
| 2013/0297604 A1 | 11/2013 | Sutedja et al. |
| 2013/0305187 A1 * | 11/2013 | Phillips et al. ................. 715/800 |
| 2013/0325705 A1 | 12/2013 | Laird et al. |
| 2013/0332850 A1 * | 12/2013 | Bovet et al. ................... 715/752 |
| 2014/0052797 A1 | 2/2014 | Lessard et al. |
| 2014/0096032 A1 | 4/2014 | Mayblum et al. |
| 2014/0115495 A1 | 4/2014 | Wetherell et al. |
| 2014/0279016 A1 | 9/2014 | Capel et al. |

* cited by examiner

400

Yesterday

| E | Electronic Invitation: Ellen's birthday party
Oct 1, 3:00pm. Restaurant, 1112 Verd... |

404-2

Pics!

| A | Anna                                               1 day ago
to me |

Here you go. -Anna

Hi Anna,

Thanks so much but you forgot to attach the photos to this email. BTW did you end up going to that concert last weekend? How was it? I really wanted to go too, but I had to take my cat to her cat ballet class. She's going to be in a recital in two weeks. You'll be coming for that right?
Oh I just remembered I have some pics to send to you too, from my trip to Catcun (the cat-friendly resort in Mexico). You should really check it out! You don't need a cat to go, but you should really take my advice and get one... or five.

I think I might start a blog about cats since I have so

414

| M | Would you be interested in doing this with me?
me, Emily – Sure, that looks like a lot of fun! It's $30/class ... |

Sunday

| T | Print at Home
ticketorders – Thank you for your order. Your e-ticket is att... |

| R | Your reservation confirmation for 2 at REST on ...
REST – You are confirmed for a reservation for 2 at REST... |

Aug 16

| B | Home!
Brent, me – Glad to hear you're home safely. Let's talk soon! |

410-14

| M | (no subject)
me – http://www.purpfairy.com/3308/15-things-you-sho... |

Figure 4N

SYSTEMS AND METHODS FOR SIMULTANEOUSLY DISPLAYING CLUSTERED, IN-LINE ELECTRONIC MESSAGES IN ONE DISPLAY

CROSS REFERENCE TO RELATED APPLICATION

This application claims priority to U.S. Provisional Patent Application No. 61/922,728, entitled "Systems and Method for Displaying Electronic Messages," filed Dec. 31, 2013, which is hereby incorporated by reference herein in its entirety.

TECHNICAL FIELD

The implementations disclosed herein relate generally to displaying electronic messages in a messaging application.

BACKGROUND

The average user account of a messaging application comprises a large number of electronic messages, such as emails, social network posts, contact information, search queries and calendar entries. Such a large number of electronic messages can be cumbersome to navigate through, particularly while viewing the contents of one of the many electronic messages. Messaging application users wish to navigate through a listing of such electronic messages, while having the ability to quickly view the contents of one electronic message in the listing of several electronic messages.

Difficulties abound with offering such a feature, however. One challenge is in making a cohesive listing of electronic messages that allows the user to have a full scope of the listing, while viewing the contents of one or more messages. Another challenge is in seamlessly transitioning from a display of a listing of electronic messages to a display comprising the contents of one or more electronic messages, and vice versa.

The above identified technical problems are reduced or eliminated by the systems and methods disclosed herein.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

SUMMARY

Figure 1:
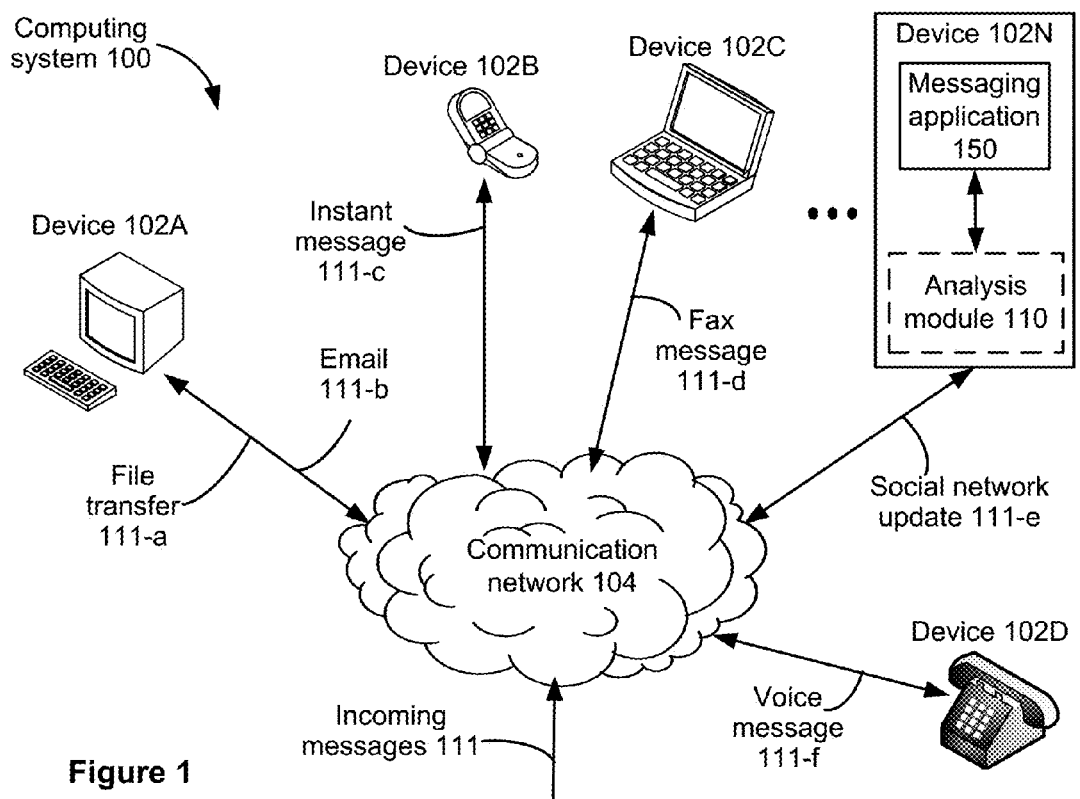
FIG. 1 is an example block diagram illustrating a computing system, in accordance with some implementations.
Figure 1:
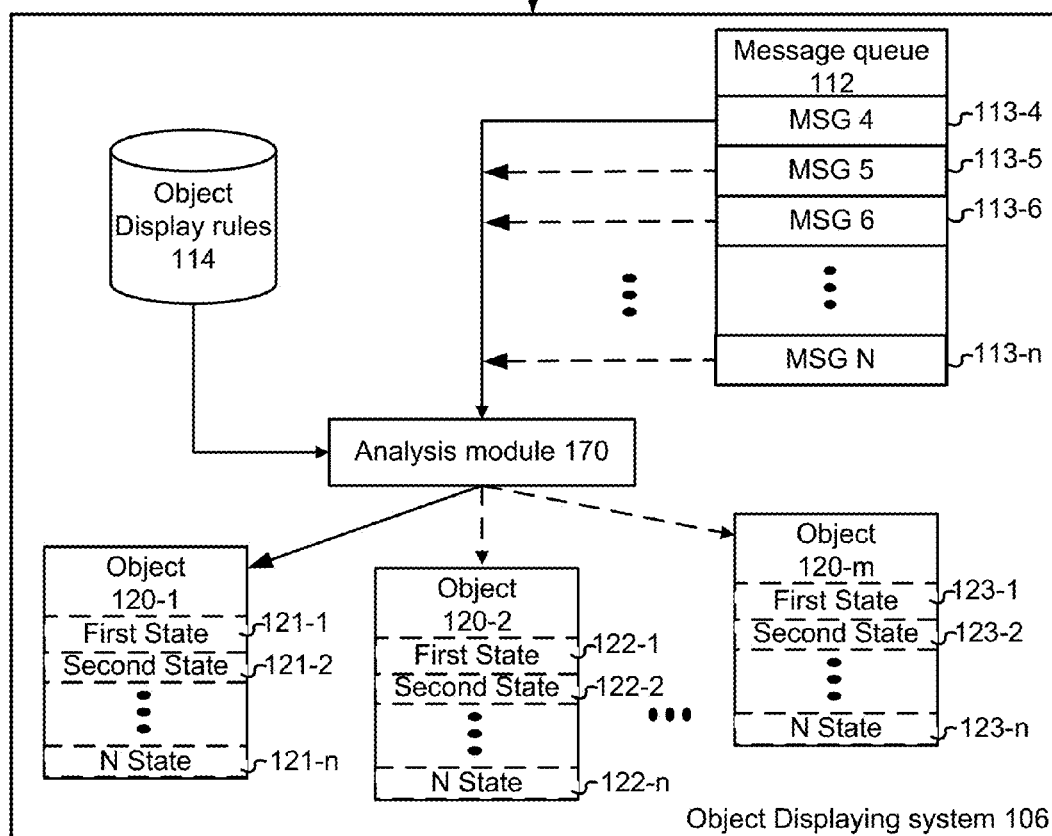

Technical solutions (e.g., computing systems, methods, and non-transitory computer readable storage mediums) for clustering electronic messages are provided in the present application.

In some implementations, a method for displaying electronic messages includes, at a computing device, displaying a user interface for a messaging application. The user interface comprises an electronic message list in an electronic message list panel. The electronic message list comprises a plurality of objects. Each respective object in the plurality of objects is visually distinct in the electronic message list and represents one or more corresponding electronic messages in a plurality of electronic messages. The method includes detecting user selection of a first object of the plurality of objects in the electronic message list panel. The method further includes, in response to detecting user selection of the first object, (i) moving a first subset of objects in the plurality of objects vertically upward, where the first subset of objects comprises one or more objects above the first object in the electronic message list panel and (ii) moving a second subset of objects in the plurality of objects vertically downward, where the second subset of objects comprises one or more objects below the first object in the panel.

In some implementations, display of the first object in the second state comprises keeping the first object displayed in-line with the plurality of objects in the electronic message list in the electronic message list panel.

In some implementations, display of the first object in the second state comprises displaying at least a portion of the selected object overlapped on one or more of the plurality of objects in the electronic message list panel.

In some implementations, toggling display of the first object from the first state to the second state includes increasing the size of the first object.

In some implementations, the method further comprises detecting user input on a portion of the user interface outside of the electronic message list panel. In some implementations, the method further comprises, in response to detecting the user input on the portion of the user interface outside of the electronic message list panel, toggling display of the first object from the second state to the first state, moving the first subset of objects vertically downward to adjoin an upper border of the first object in the first state and moving the second subset of objects vertically upward to adjoin a lower border of the first object in the first state.

In some implementations, the method further comprises detecting user selection of a second object of the plurality of objects in the electronic message list panel. In some implementations, the method further comprises, in response to detecting user selection of the second object at a time when the first object is in the second state and all other objects in the plurality of objects is in the first state, toggling display of the first object from the second state to the first state and (i) moving the first subset of objects vertically downward to adjoin an upper border of the first object and (ii) moving the second subset of objects vertically upward to adjoin a lower border of the first object. In some implementations, the method further comprises toggling display of the second object from the first state to the second state and (i) moving a third subset of objects in the electronic message list panel, wherein the third subset of objects comprises one or more objects above the second object, vertically upward to adjoin an upper border of the second object in the second state and (ii) moving a fourth subset of objects, where the fourth subset of objects comprises one or more objects below the selected second object in the electronic message list panel, vertically downward to adjoin a lower border of the second object in the second state.

In some implementations, the one or more electronic messages corresponding to the first object comprise a single first email message, the first state consists of a subset of the content of the single first email message and the second state comprises the full content of the single first email message.

In some implementations, the one or more electronic messages corresponding to the first object consists of a single first email message, the first state consists of a subset of the content of the single first email message and the second state comprises the full content of the single first email message.

In some implementations, the one or more electronic messages corresponding to the first object consists of a single first email message, the first state consists of a first subset of the content of the single first email message and the second state comprises a second subset of the single first email message, wherein the second subset has more content of the single first email message than the second subset.

In some implementations, the full content of the single first email message comprises the text of a body of the email, and a text field to receive a typed response.

In some implementations, the method further comprises detecting user entry of text in the text field of the first email message, and in response to detecting user entry of text in the text field, adaptively resizing the visually displayed portion of the text field to accommodate more text and repositioning the resized text field within the electronic message list panel.

In some implementations, repositioning the resized text field within the electronic message list panel comprises moving the first subset of objects in the plurality of objects vertically upward and moving the second subset of objects in the plurality of objects vertically downward.

In some implementations, the one or more electronic messages corresponding to the first object, is a plurality of email messages having a collective association. In some implementations, the first state comprises a summary of the contents of the plurality of email messages and the second state comprises a listing of all the email messages in the plurality of email messages. In such implementations, each respective email message in the plurality of email messages is displayed in a third state consisting of a subset of the content of the respective email message.

In some implementations, the method further comprises detecting user selection of one of the email messages respectively displayed in the third state. In some implementations, the method further comprises, in response to detecting user selection of the email message, toggling display of the selected email message from the third state to a fourth state, where the fourth state comprises the full content of the selected email message, while keeping the selected email message displayed in-line with the remaining plurality of email messages, moving a first subset of emails in the plurality of emails vertically upward and moving a second subset of emails in the plurality of emails vertically downward.

In some implementations, the first subset of emails comprises one or more electronic messages above the selected email message in the plurality of email messages having a collective association, and the first subset of objects. In some implementations, the second subset of emails comprises one or more email messages below the selected email message in the plurality of email messages having a collective association, and the second subset of objects.

In some implementations, each electronic message in the plurality of electronic messages is contact information, an email message, an indication of a document, a calendar entry, an email label, a social network notification, a recent search query, a suggested search query, or a web search result.

In other aspects of the present disclosure, computing systems and non-transitory computer storage mediums for executing one or more steps of any of the above-described methods are also disclosed.

DETAILED DESCRIPTION

The implementations described herein provide various technical solutions to improving access to electronic messages, and in particular to the above-identified problems, by providing techniques for displaying electronic messages to a user.

Details of implementations are now described in relation to the Figures.

FIG. 1 is a block diagram illustrating a computing system 100, in accordance with some implementations.

In some implementations, the computing system 100 includes one or more devices 102 (e.g., device 102A, 102B, 102C, 102D . . . , and 102N), a communication network 104, and a object displaying system 106. In some implementations, a device 102 is a phone (mobile or landline, smart phone or otherwise), a tablet, a computer (mobile or otherwise), a fax machine, or an audio/video recorder.

In some implementations, a device 102 obtains an electronic message from (e.g., drafted or generated by) a user of the device 102, and transmits the electronic message to the object displaying system 106 for displaying with other electronic messages. For example, after determining that user Jack sends an electronic message to user Mary, the device 102 transmits the electronic message to the object displaying system 106, which processes the electronic message into an object for display in a listing of electronic messages.

In some implementations, an electronic message is a file transfer 111-a (e.g., a photo, document, or video download/upload), an email 111-b, an instant message 111-c (e.g., a GOOGLE HANGOUT message), a fax message 111-d, a social network update 111-e (e.g., a GOOGLE PLUS update), or a voice message 111-f. In some implementations, an electronic message is contact information, an indication of a document, a calendar entry, an email label, a recent search query, a suggested search query, or a web search result.

In some implementations, a device 102 includes a messaging application 150 and optionally an analysis module 110. In some implementations, the messaging application 150 processes incoming and outgoing electronic messages into and from the device 102, such as an outgoing email sent by a user of the device 102 to another user, and a chat message by another user to a user of the device 102. In some embodiments the messaging application 150 is an e-mail application. In some implementations, the analysis module 110 resident on the device 102 balances processing load with the analysis module 170 resident on the object displaying system 106. For example, after a user requests to send out a total of six emails, the analysis module 110 on the device 102 processes the first three emails (which include plain text emails, e.g., without HTML content or attachments, and thus might require less processing power), and the analysis module 170 on object displaying system 106 processes the remaining three emails (which include HTML content or attachments, and thus might require more processing power).

In some implementations, the communication network 104 interconnects one or more devices 102 with each other, and with the object displaying system 106. In some implementations, the communication network 104 optionally includes the Internet, one or more local area networks (LANs), one or more wide area networks (WANs), other types of networks, or a combination of such networks.

Figure 3:
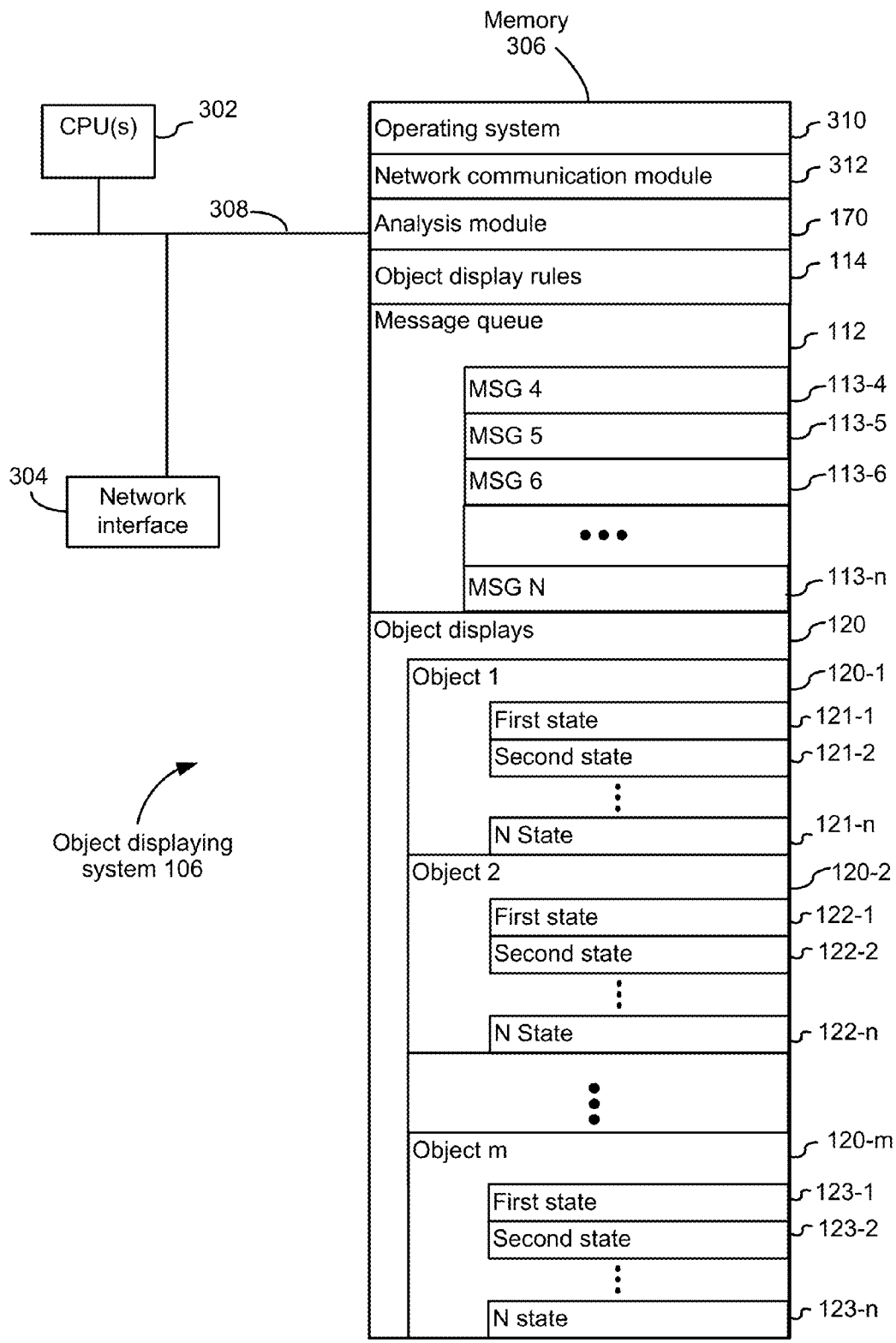
FIG. 3 is an example block diagram illustrating an object-displaying system, in accordance with some implementations.

With reference to FIGS. 1 and 3, in some implementations, the object displaying system 106 includes an analysis module 170, a message queue 112 and a collection of object display rules 114 (e.g., user- or system-provided rules).

In some implementations, the object displaying system 106 analyzes content of incoming electronic messages (e.g., incoming messages 111), and assigns these electronic messages to one or more objects (e.g., objects 120-1, 120-2 . . . 120-m). In some embodiments, an object (e.g., object set 120-1) corresponds to one electronic message, with one or more display states (e.g., states 121-1, 121-2 . . . 121-n). For example, object 120-1 may consist of a single email from user Jack to user Mary, with a first display state of a short subset of text in the single email, and a second display state comprising the full text of the body of the email. In some embodiments, an object (e.g., object 120-1) corresponds to more than one electronic message, with one or more display states (e.g., states 121-1, 121-2 . . . 121-n). For example, after analyzing the message body of an email, the object displaying system 106 determines (e.g., with a 90% confidence level) that the email is a "Promotion" email (e.g., an email with advertising materials), and accordingly assigns the email to a "Promotion object" (e.g., object 120-2). In some implementations, assigning an email to an object includes assigning a label (a "Promotion" or "Travel" label) that represents the object. In this example, the "Promotion" object has at least three display states, a first display state (e.g., 121-1) displaying a short text-based summary of the various electronic messages in the object 120-1, a second display state (e.g., 121-2) displaying a listing of the electronic messages in the object 120-1 with a subset of the text for each respective electronic message, and a third display state (e.g., 121-3) comprising the full text of the body of one of the electronic messages in object 120-1. In some embodiments, an object comprises a single electronic message (e.g., a Social Network cluster comprising one social network update message). In some embodiments, an object is a message cluster. Message clusters are defined on the basis of one or more clustering rules.

In some implementations, the analysis module 170 analyzes an electronic message against object display rules 114, to determine how to display the electronic message. For example, an incoming electronic message is first analyzed to determine if it can be displayed as a part of one or more existing objects (e.g., object 120-1 . . . 120-m). For example, if an object 120-1 comprises a single email from user Jack to user Mary, an email message comprising a reply from user Mary to user Jack would also be placed in object 120-1 by the analysis module 170. In another example, if the analysis module 170 analyzes an electronic message and determines that it is a single message corresponding to a social network post, and that none of the existing objects corresponds to social network messages (or social network messages from that social network), the analysis module 170 places the single message corresponding to a social network post into a new object. In some embodiments, the analysis module 170 also determines and updates one or more display states for the respective object of the plurality of objects (e.g., object sets 120-1 . . . 120-m).

In some implementations, the analysis module 110 is a software or hardware component resident on the device 102, such as a software package/application or a hardware chipset, for clustering electronic messages, and analysis module 170 on server 106 is not used. In some implementations, the analysis module 110 is not present and analysis module 170, which exists separate from or independent of the device 102 is used (e.g., a GOOGLE mail processing server that is connected with but not part of the device 102, e.g., in the manner depicted in FIG. 1 with analysis module 170). In still other implementations, the analysis module 110 is a software or hardware component resident on the device 102, such as a software package/application or a hardware chipset, for displaying electronic messages, and analysis module 170 on server 106 is also used. That is, both analysis module 110 on device 102 and analysis module 170 on server 106 are used. For instance, in some such embodiments some object display rules 114 (e.g. user-specified rules) are implemented on device 102 and implemented using analysis module 110 and some object display rules 114 (e.g., system-provided rules) are implemented on server 106 and implemented using analysis module 170. In some embodiments, some object display rules are generated on server 106 and distributed to devices 102 for enforcement and/or implementation by analysis module 110. For instance, a set of display rules can be distributed in the form of a profile or set of rules. In some embodiments, such distribution of rules to devices 102 occurs on a recurring basis (e.g., periodic or nonperiodic basis).

In some implementations, the message queue 112 stores one or more electronic messages awaiting analysis by the analysis module 170, such as MSG 4, MSG 5, MSG 6, . . . and MSG N (FIG. 1, 113-4 . . . 113-n). In some implementations, the message queue 112 includes different types of electronic messages, such as a file transfer 111-*a* (e.g., a photo, document, or video upload), an email 111-*b*, an instant message 111-*c* (e.g., a Google HANGOUT message), a fax message 111-*d*, a social network update 111-*e* (e.g., a GOOGLE PLUS update), a voice message 111-*f*, contact information, an indication of a document, a calendar entry, an email label, a recent search query, a suggested search query, or a web search result.

In some implementations, the collection of object display rules 114 include system- and user-specified display rules. In some implementations, system-provided rules are determined by the object displaying system 106 (e.g., default display rules), and user-specified rules are customized (e.g., added, removed, or modified) by a user.

Figure 2:
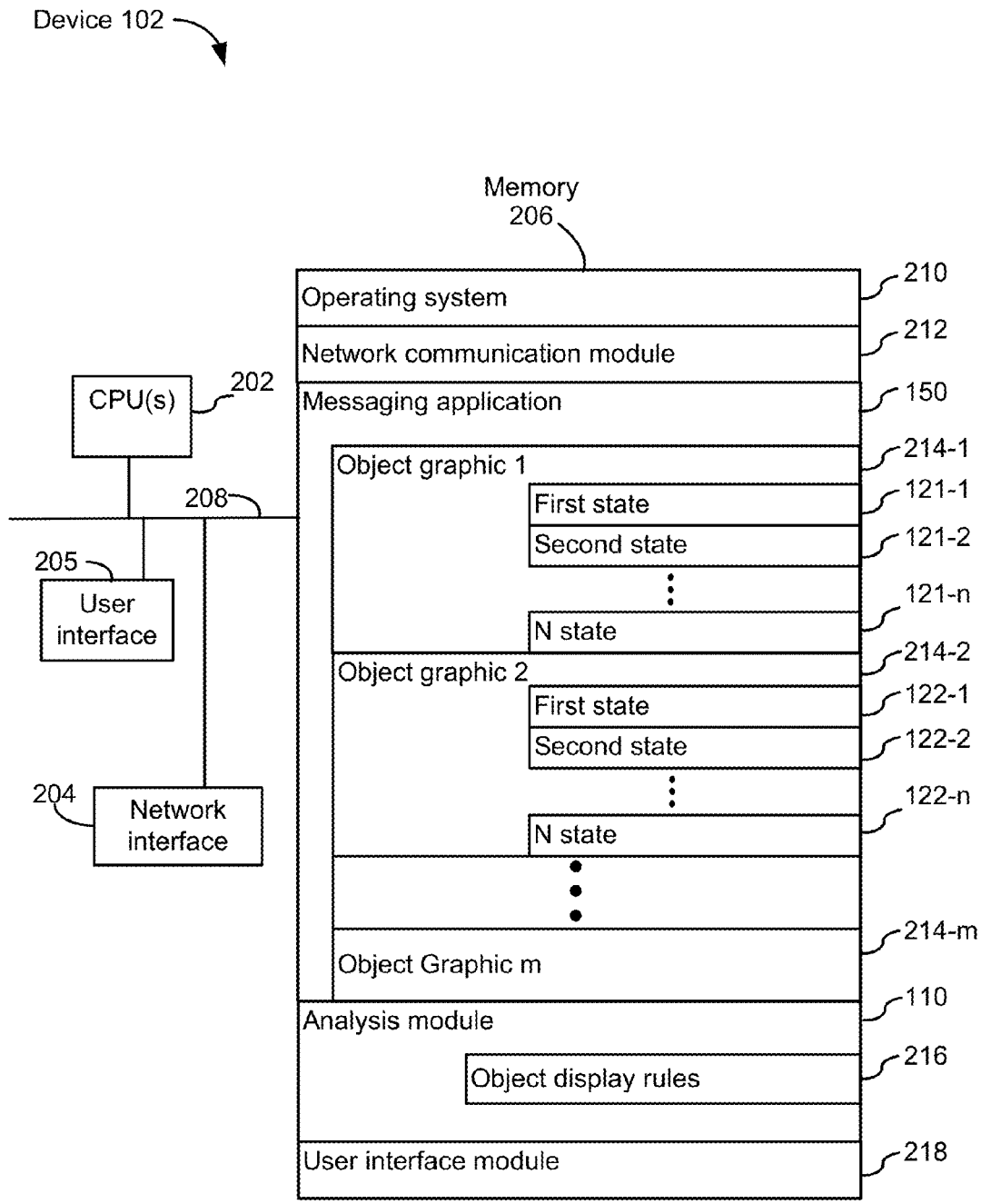
FIG. 2 is an example block diagram illustrating a computing device, in accordance with some implementations.

FIG. 2 is a block diagram illustrating a computing device 102, in accordance with some implementations. The device 102 in some implementations includes one or more processing units CPU(s) 202 (also referred to as processors), one or more network interfaces 204, a user interface 205, a memory 206, and one or more communication buses 208 for interconnecting these components. The communication buses 208 optionally include circuitry (sometimes called a chipset) that interconnects and controls communications between system components. The memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

- an operating system 210, which includes procedures for handling various basic system services and for performing hardware dependent tasks;
- a network communication module (or instructions) 212 for connecting the device 102 with other devices (e.g., the object displaying system 106 and the devices 102B . . . 102N) via one or more network interfaces 204 (wired or wireless), or the communication network 104 (FIG. 1);
- a messaging application 150 for processing and displaying incoming and outgoing electronic messages, e.g., using object graphics, including:

an object graphic 1 (214-1) that visually displays any one of a First Display State (121-1), Second Display State (121-2), up to an Nth Display State (121-n) where object graphic 1 comprises one or more electronic messages;

an object graphic 2 (214-2) that visually displays any one of a First Display State (122-1), Second Display State (122-2), up to an Nth Display State (122-n) where object graphic 2 comprises one or more electronic messages; and an object graphic m (214-m) that visually displays any one of a number of display states—where object graphic m comprises one or more electronic messages;

optionally an analysis module 110 for analyzing content of (e.g., income and outgoing) electronic messages, and assigning electronic messages to one or more object sets in accordance with therewith, in accordance with object display rules 216; and a user interface module 218 for displaying user interface components or controls (e.g., textbox, button, radio button, drop-down list) to a user.

In some implementations, the user interface 205 includes an input device (e.g., a keyboard, a mouse, a touchpad, a track pad, and a touch screen) for a user to interact with the device 102.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

FIG. 3 is a block diagram illustrating an object displaying system 106, in accordance with some implementations. The object displaying system 106 typically includes one or more processing units CPU(s) 302 (also referred to as processors), one or more network interfaces 304, memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternatively the non-volatile memory device(s) within the memory 306, comprises a non-transitory computer readable storage medium. In some implementations, the memory 306 or alternatively the non-transitory computer readable storage medium stores the following programs, modules and data structures, or a subset thereof:

an operating system 310, which includes procedures for handling various basic system services and for performing hardware dependent tasks;

a network communication module (or instructions) 312 for connecting the object displaying system 106 with other devices (e.g., the devices 102) via the one or more network interfaces 304 (wired or wireless), or the communication network 104 (FIG. 1);

an analysis module 170 for conducting a content-based analysis on (e.g., incoming and outgoing) electronic messages and assigning electronic messages to one or more object sets in accordance with the content based analysis;

a message queue 112 for storing electronic messages awaiting processing by the analysis module 170, e.g., MSG 4, MSG 5, MSG 6, . . . and MSG n (113-4 . . . 113-n);

a collection of object display rules 114, which specify or determine the corresponding display state or states for a respective object; and one or more object displays 120 for displaying electronic messages assigned thereto, which include:

object 120-1, for displaying electronic message(s) assigned thereto, in any one of the following display states:
first display state 121-1;
second display state 121-2; and up to
$n^{th}$ display state 121-n;

object 120-2, for displaying electronic message(s) assigned thereto, in any one of the following display states:
first display state 122-1;
second display state 122-2; and up to
nth display state 122-n;

object set 120-m, for displaying electronic message(s) assigned thereto, in any one of the following display states:
first display state 123-1;
second display state 123-2; and up to
nth display state 123-n.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 306 optionally stores a subset of the modules and data structures identified above. Furthermore, the memory 306 may store additional modules and data structures not described above.

Although FIGS. 2 and 3 show a "device 102" and an "object displaying system 106," respectively, FIGS. 2 and 3 are intended more as functional description of the various features which may be present in computer systems than as a structural schematic of the implementations described herein. In practice, and as recognized by those of ordinary skill in the art, items shown separately could be combined and some items could be separated.

Figure 4A:
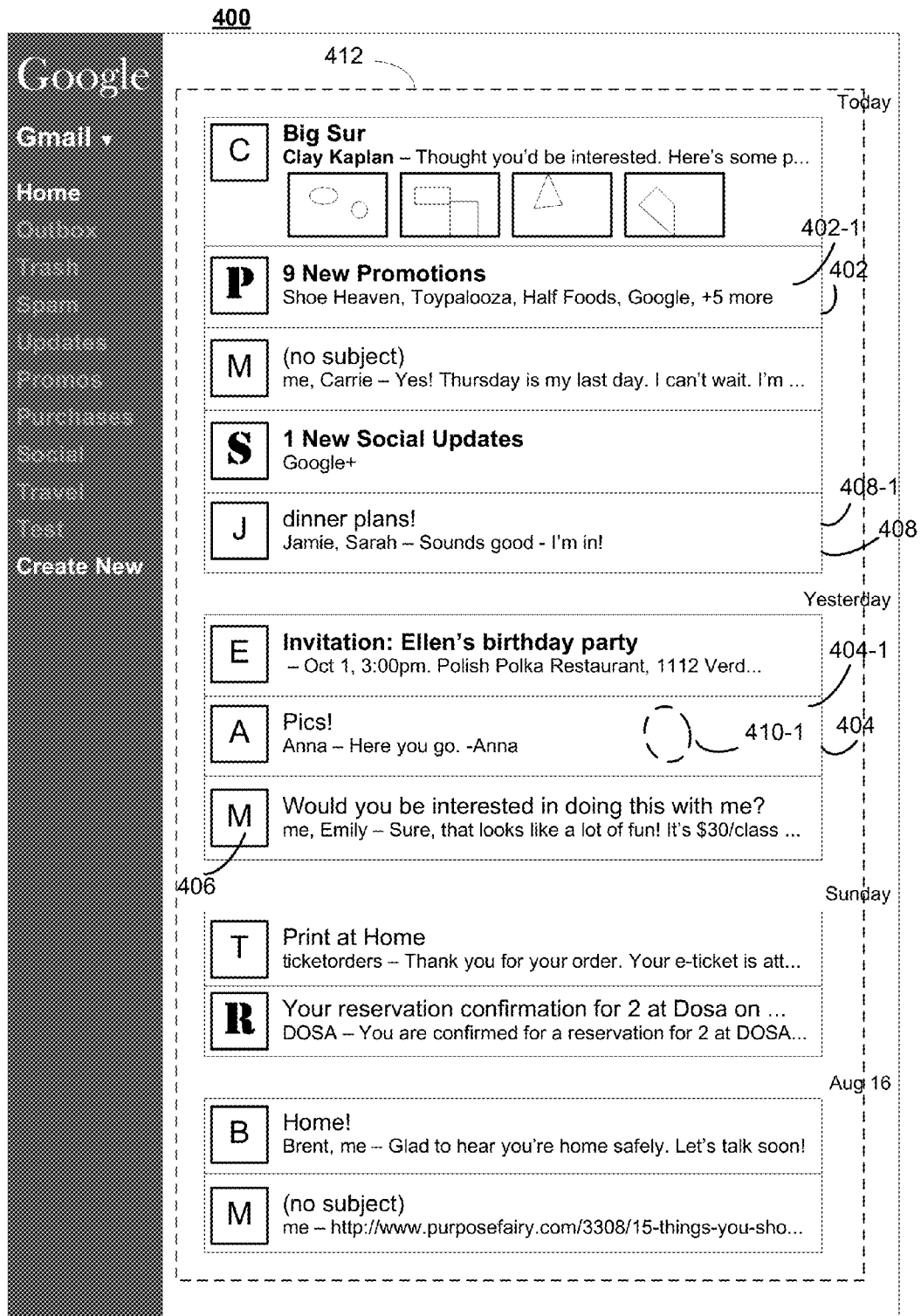
FIGS. 4A-4R are depictions of an exemplary messaging application user interface for displaying electronic messages in accordance with some implementations.
Figure 4B:
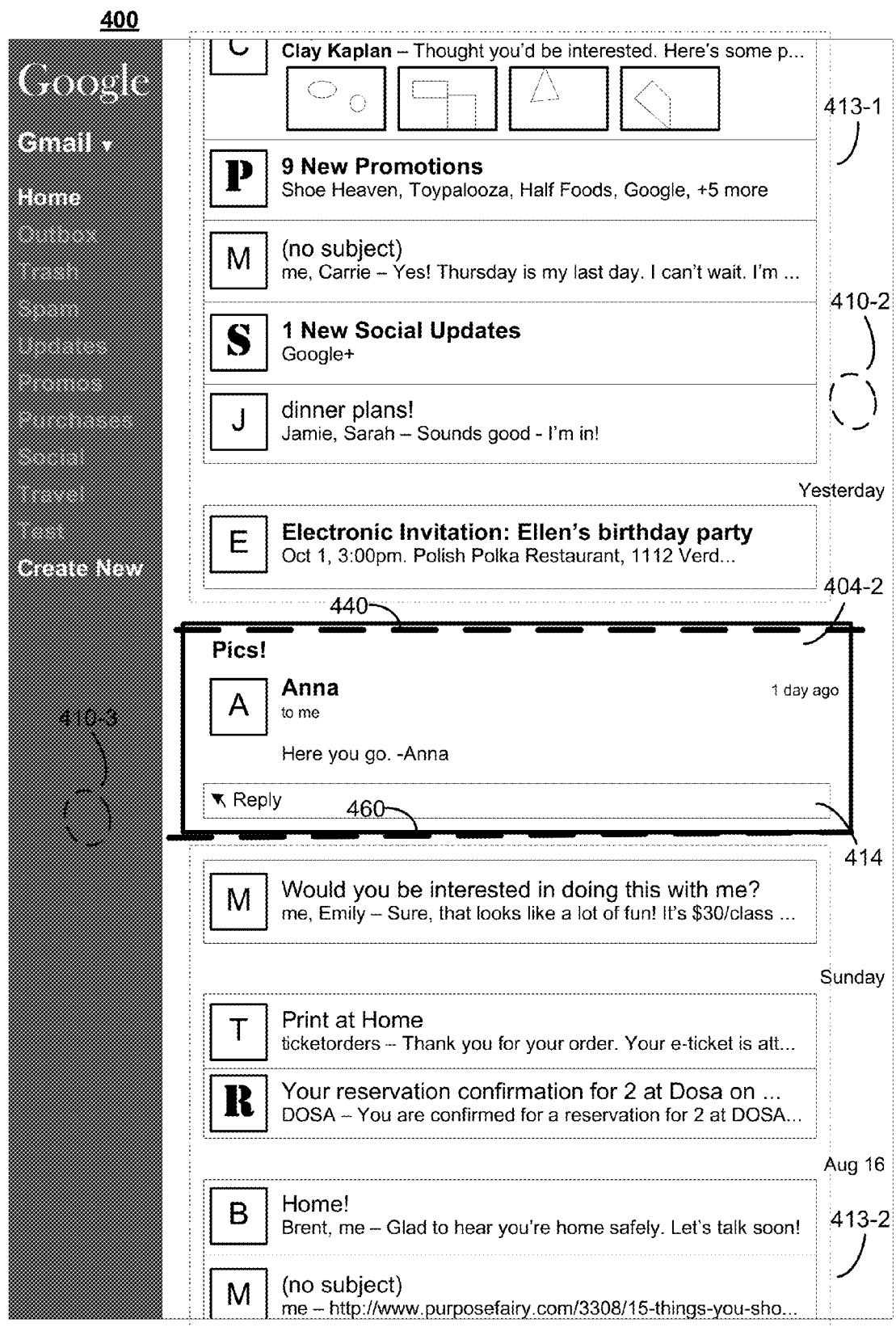
Figure 4C:
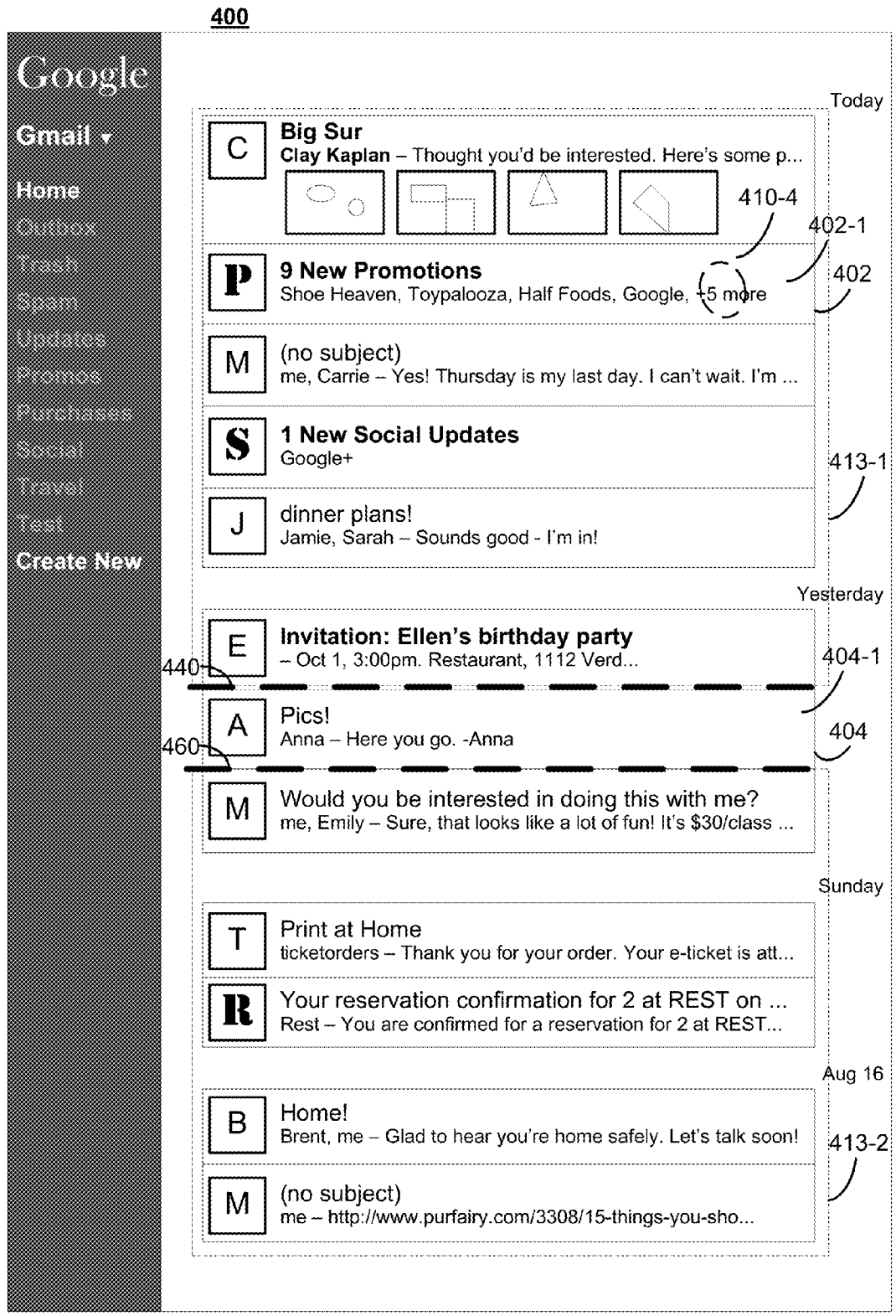
Figure 4D:
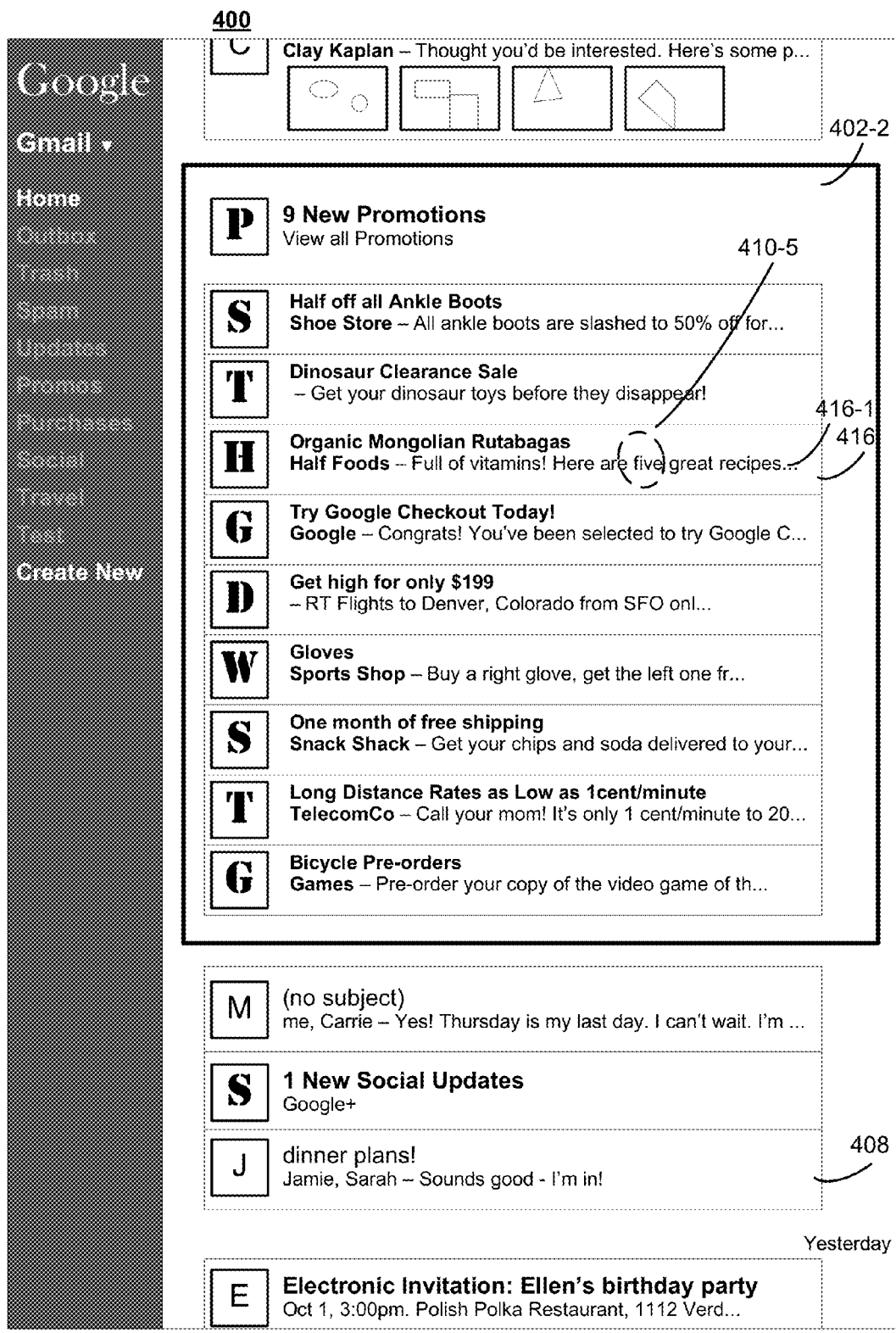
Figure 4E:
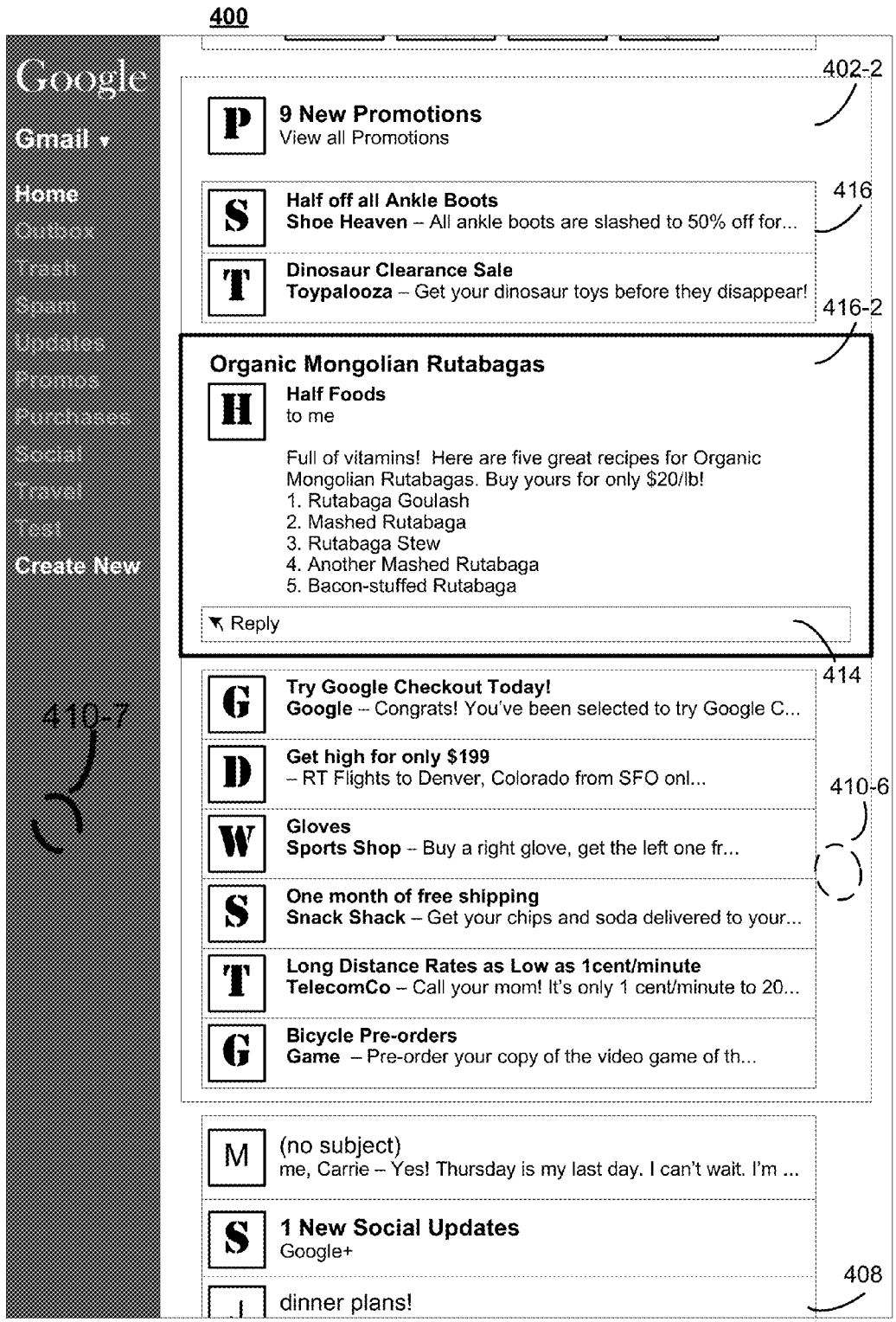
Figure 4F:
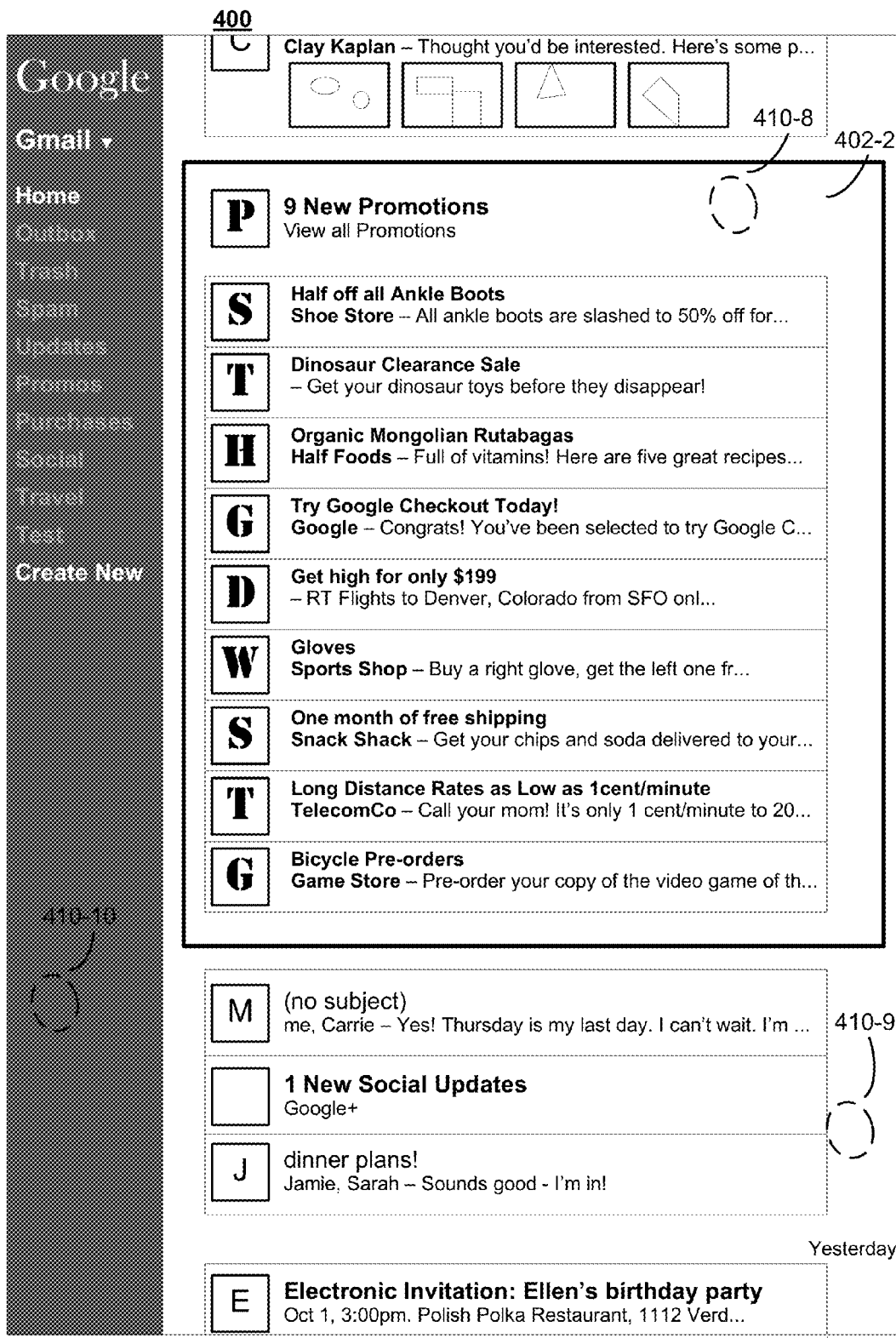
Figure 4G:
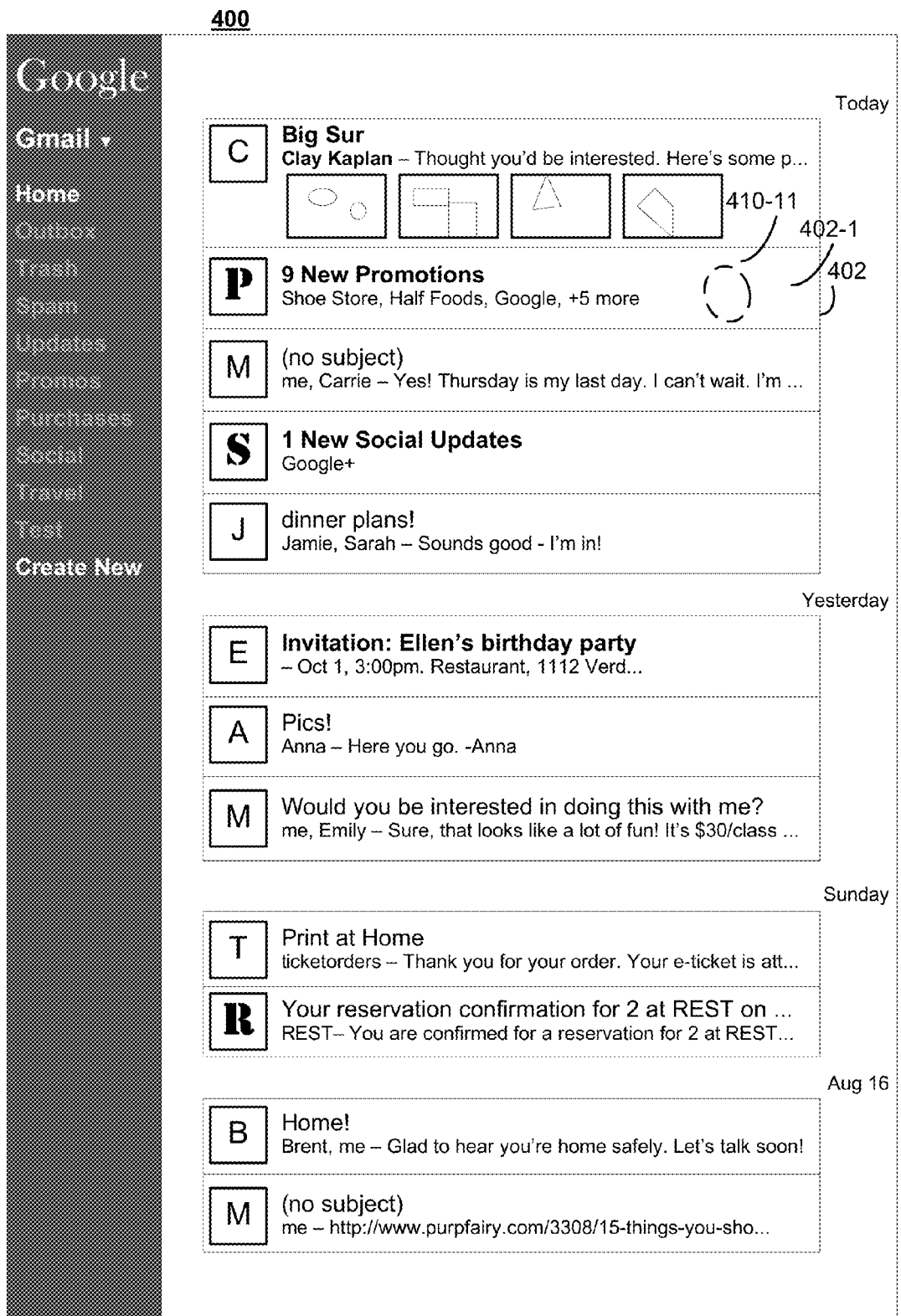
Figure 4H:
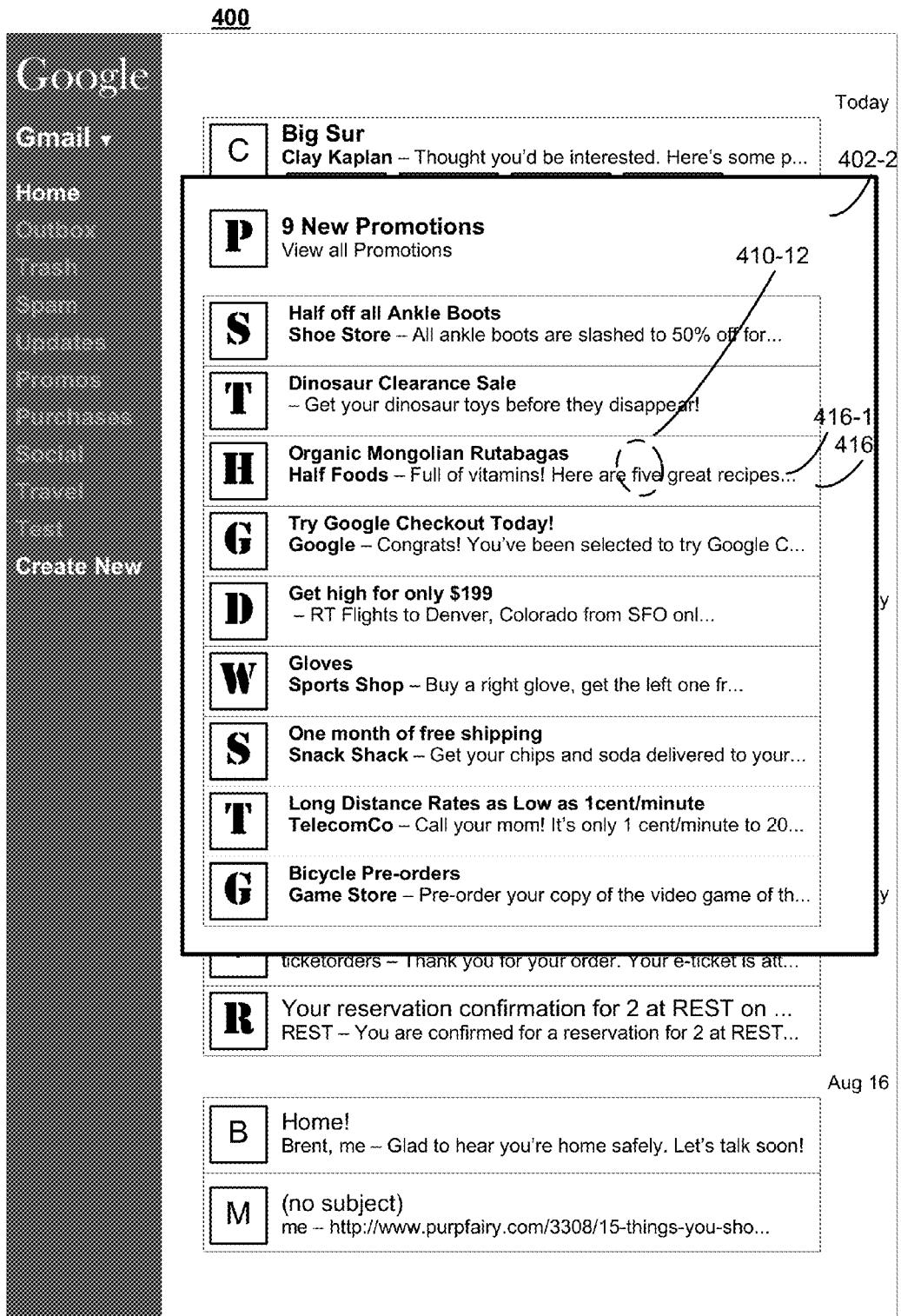
Figure 4I:
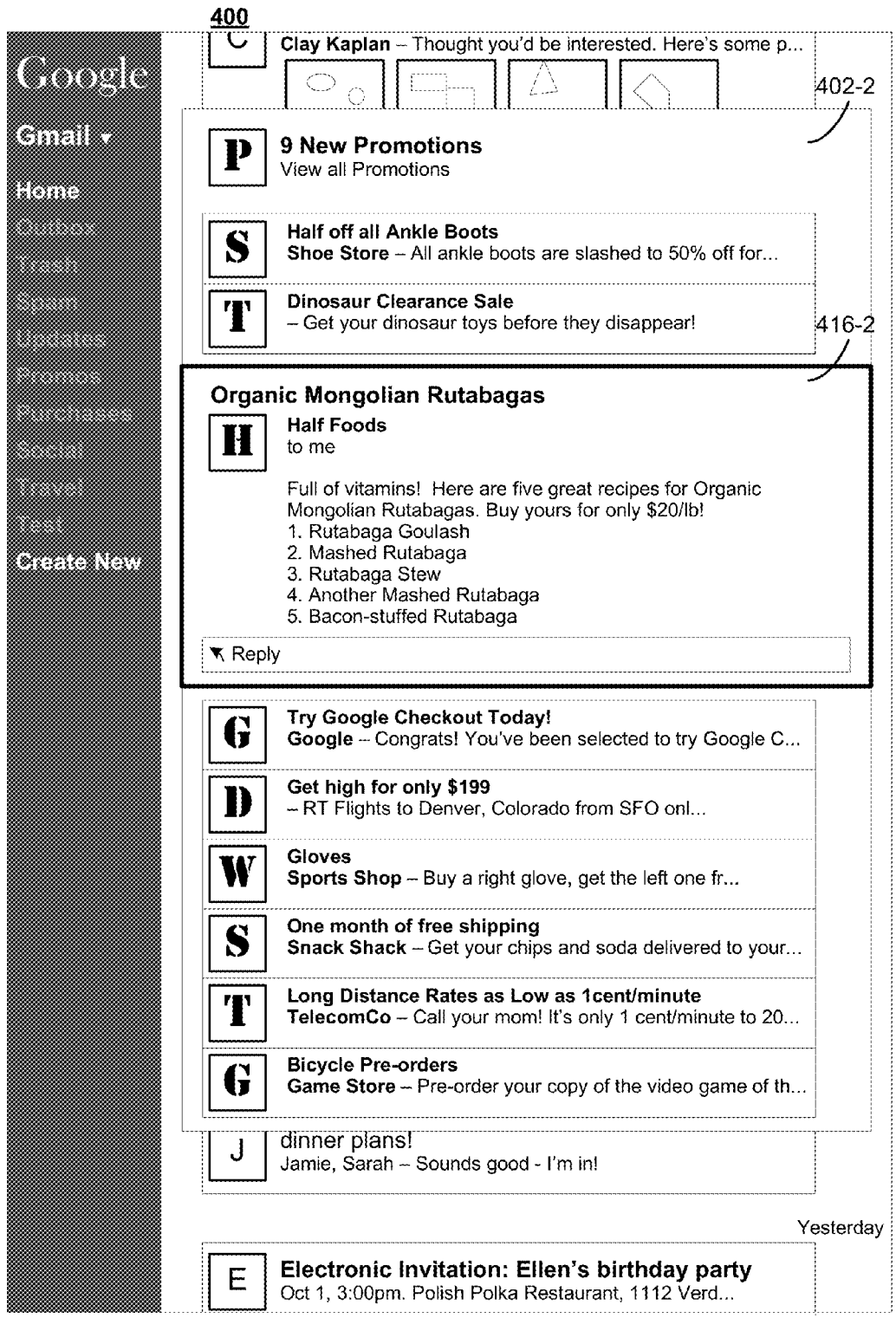
Figure 4J:
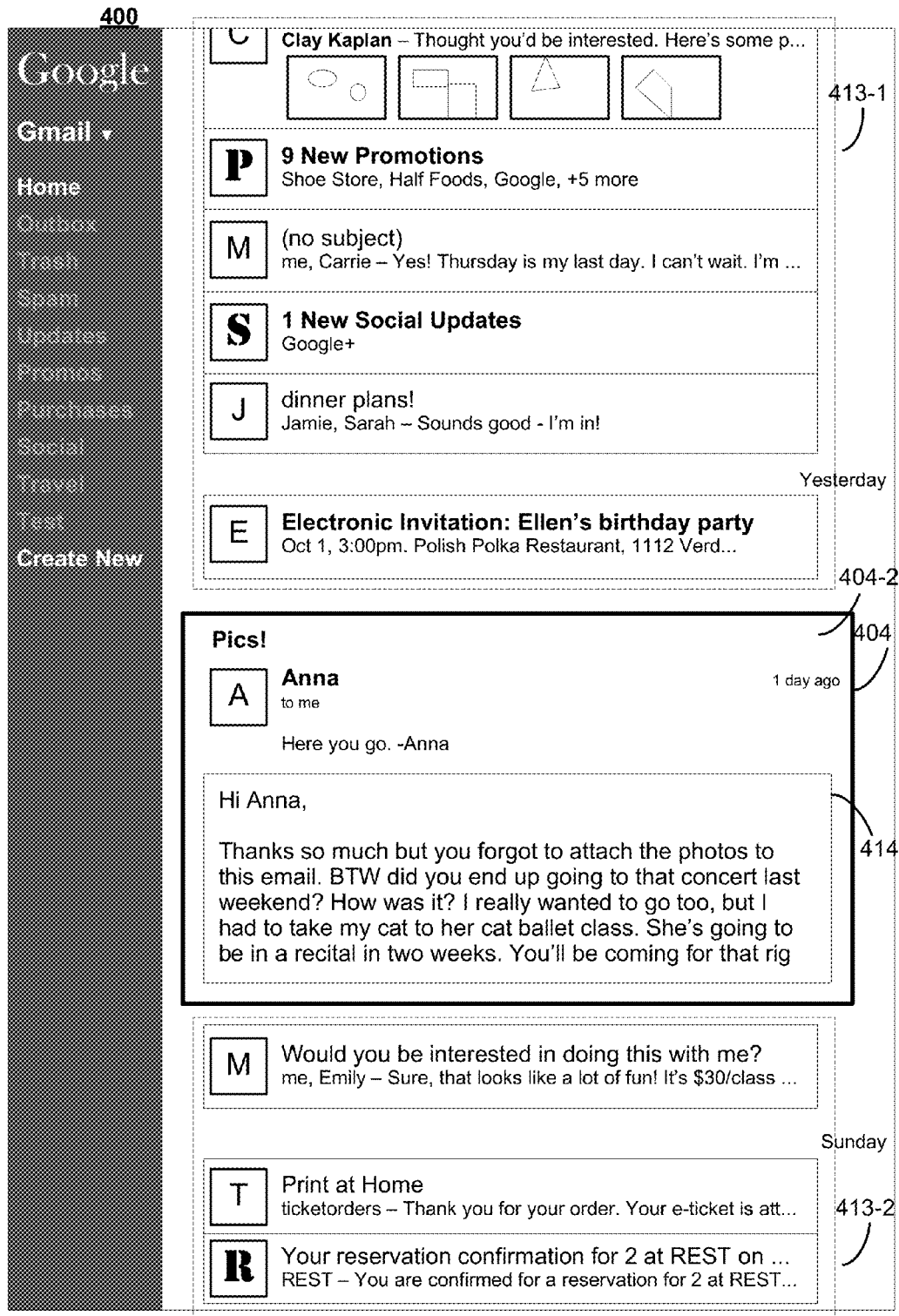
Figure 4K:
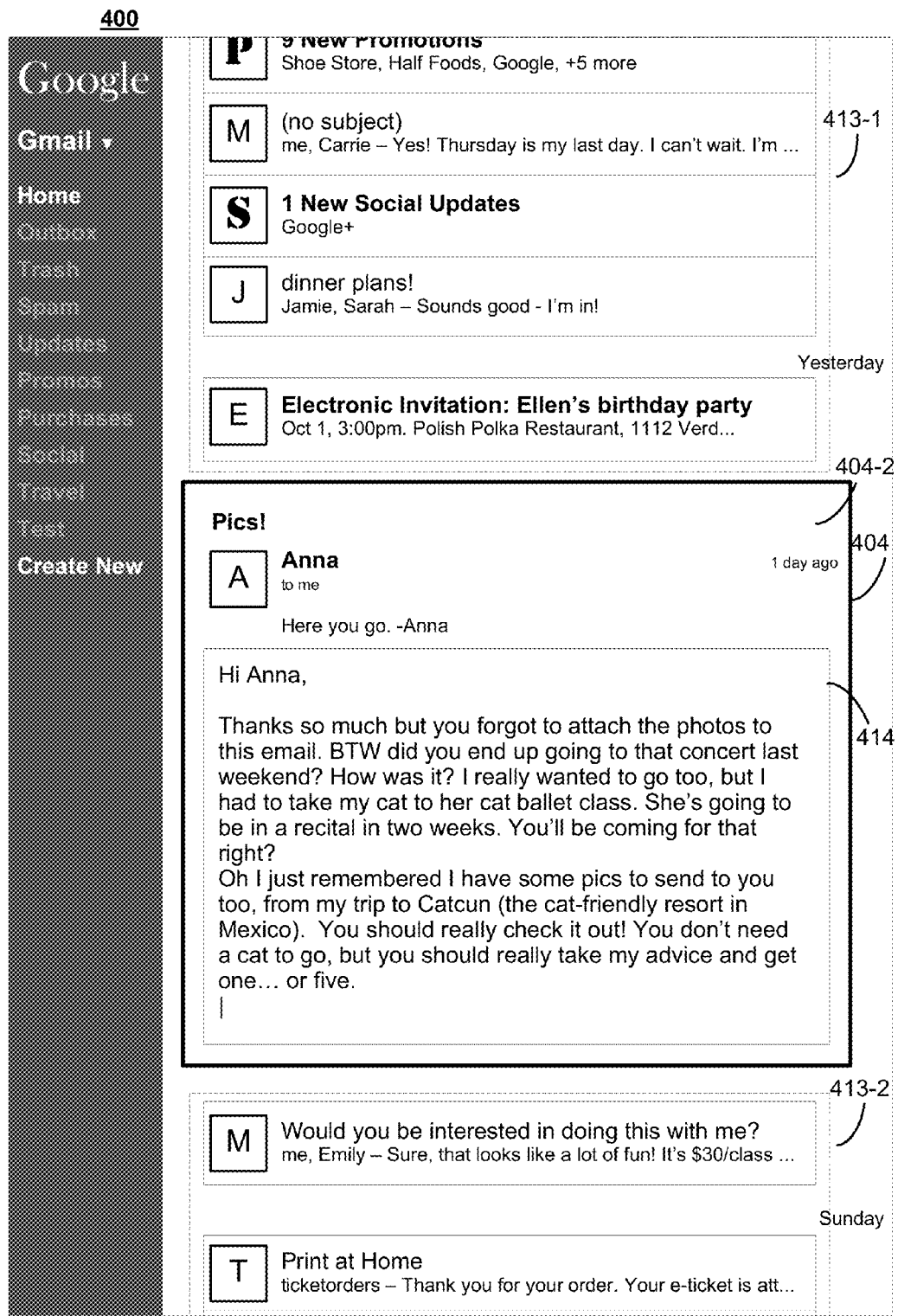
Figure 4L:
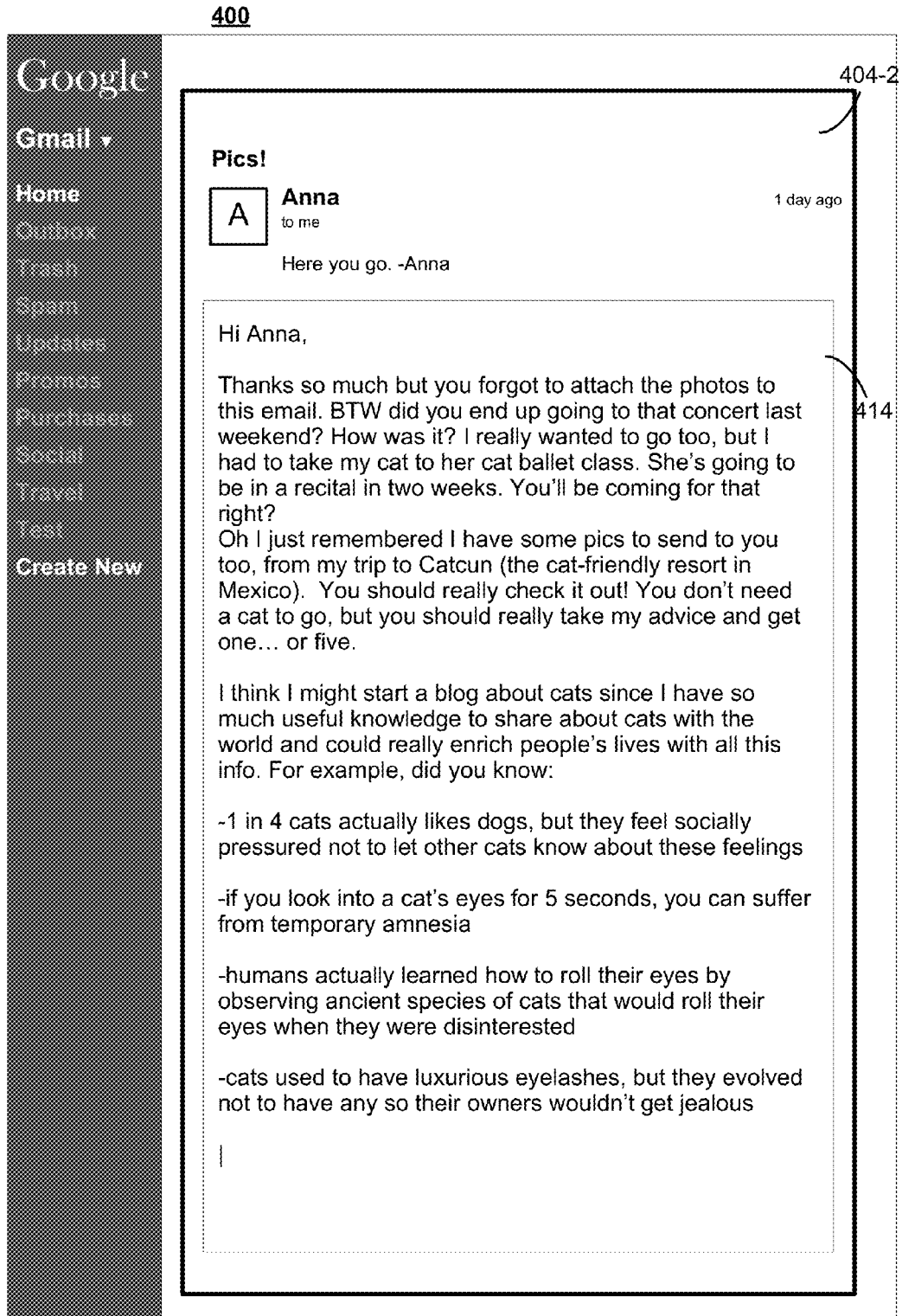
Figure 4M:
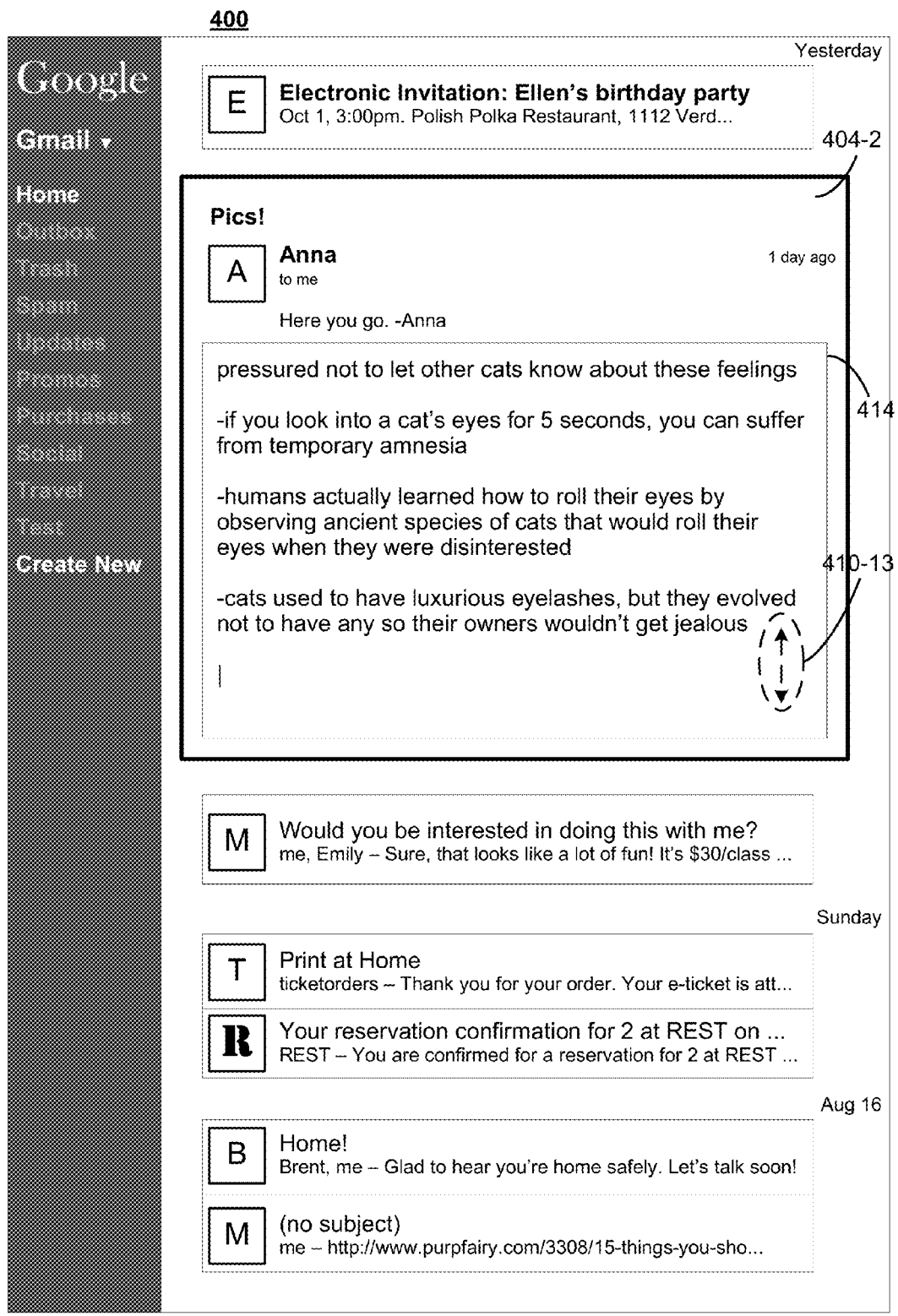
Figure 4O:
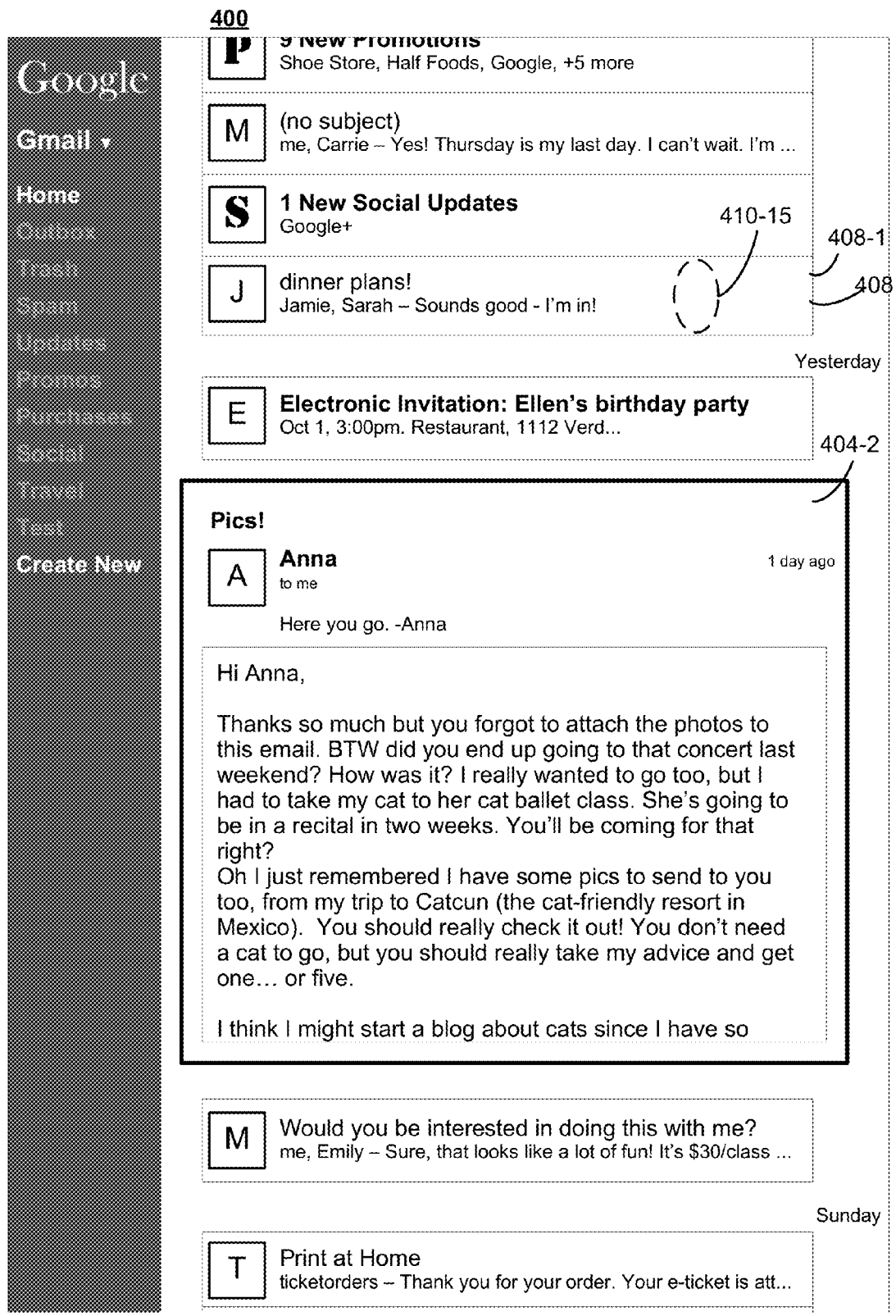
Figure 4P:
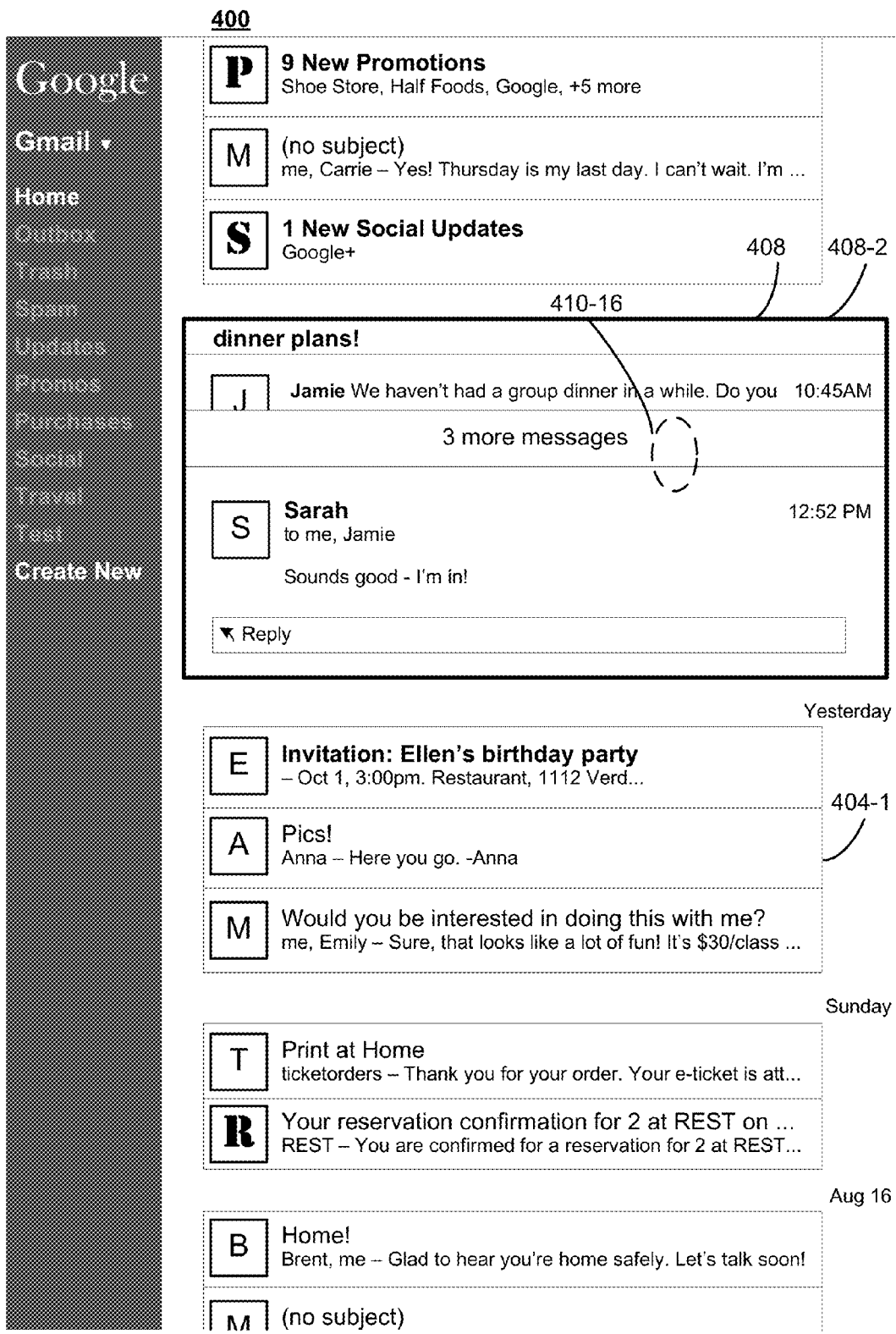
Figure 4Q:
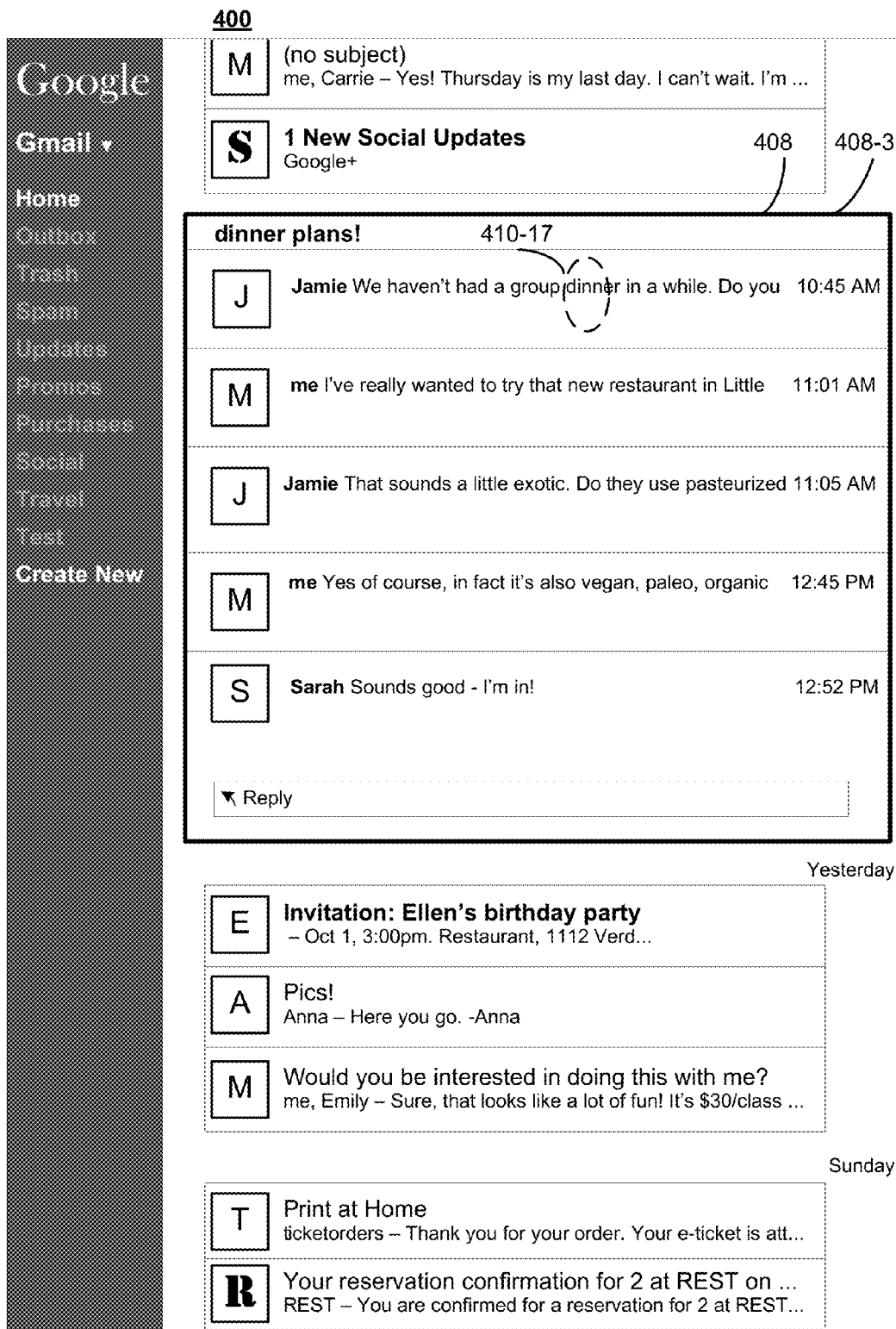
Figure 4R:
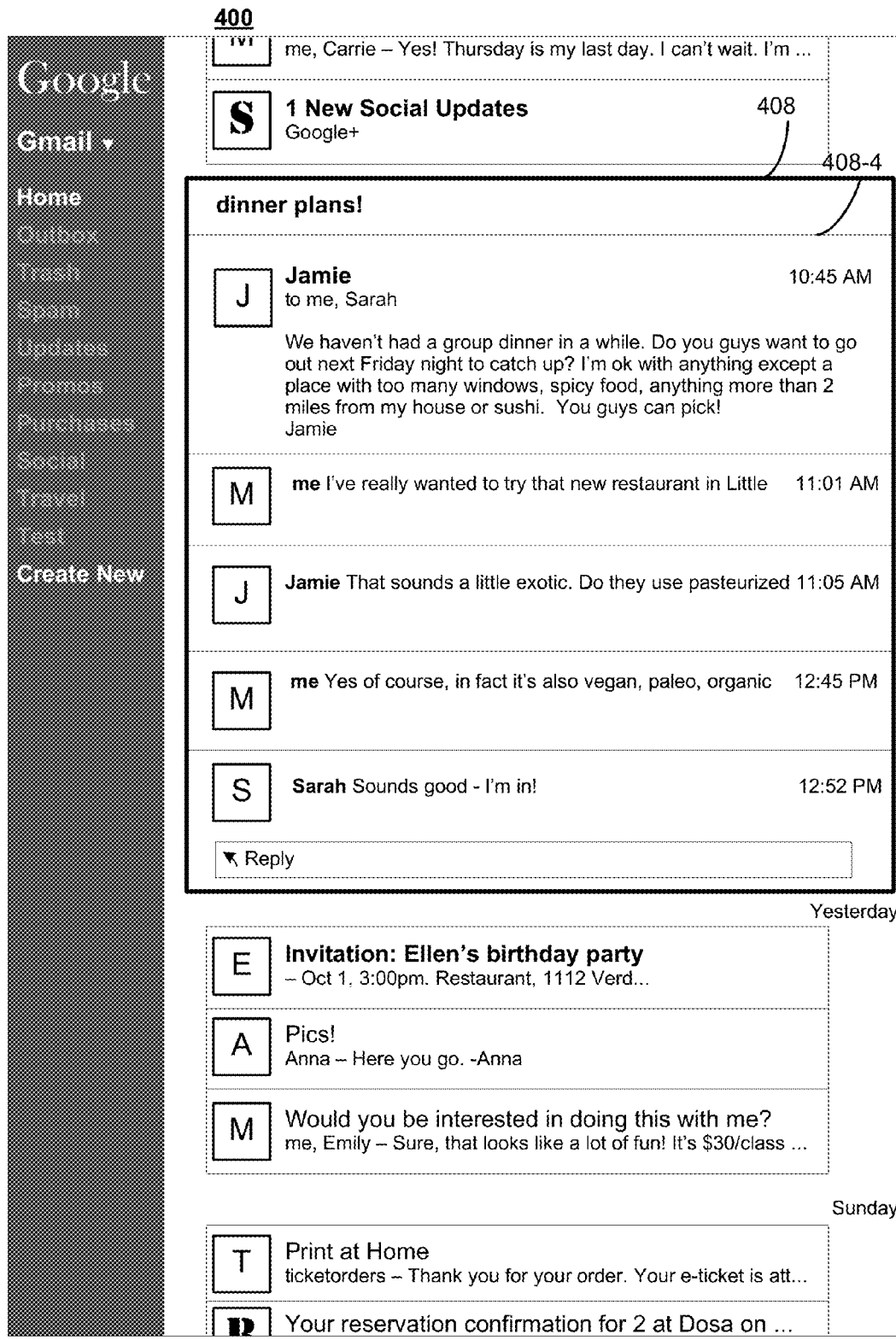

FIGS. 4A-4R illustrate depictions of an exemplary messaging application 150 user interface for displaying electronic messages in accordance with some implementations.

An exemplary user interface 400 for a messaging application is shown in FIG. 4A. In some embodiments, the exemplary user interface 400 comprises an electronic message list 412. In some embodiments, the electronic message list 412 is displayed in an electronic message list panel (e.g., the portion of user interface 400 with a white background). The electronic message list 412 comprises a plurality of objects, such as object 402, object 404 and object 408. In some embodiments, a respective object in the plurality of objects is visually distinct in the electronic message list and represents one or more corresponding electronic messages in a plurality of electronic messages. For example, object 402 corresponds to a group or "cluster" of electronic messages (e.g., emails) having a collective association. In this case, the cluster of emails corresponding to object 402 comprises nine email messages relating to "Promotions," such as retail sales, newsletters from stores or coupons from businesses. In another example, object 404 corresponds to a single email message from a user named Anna. In another example, object 408 corresponds to another form of a group of electronic messages having a collective association, an email conversation thread comprising at least two email messages having a collective association (e.g., based on subject of the email, recipients and senders or another an identification number).

Exemplary FIG. 4A also depicts a plurality of objects displayed in their respective "first display state." For example, object 402 is displayed in first display state 402-1 and object 404 is displayed in first display state 404-1. In some embodiments, the first display state for a respective object comprises at least a subset of the text of the one or more electronic messages associated with the respective object. For example, first state 404-1 for object 404, displays at least a subset of the body of the email message from Anna. In some embodiments, the first state displays all the text of one or more electronic messages associated with the respective object. The example of first state 404-1 illustrates an embodiment where the body text of the single email message in object 404 is fairly short, so the entire body text of the email fits in the first display state 404-1. In some embodiments, the first display state of a respective object comprises a subset of the body text of the most recent electronic message in the plurality of electronic messages associated with the respective object. For example, object 408 corresponds to an email "thread" or email "conversation," comprising more than one email message. In first display state 408-1 for object 408, a subset of the text of the most recent email message in the plurality of emails associated with object 408, is displayed (e.g., "Sounds good—I'm in!"). In some embodiments, the first display state of a respective object comprises display of a logo or symbol 406 to assist the user in quickly locating a particular object in the electronic message list.

FIG. 4A also illustrates detection of a user input 410-1 on the electronic message list. More specifically, user input 410-1 is detected on object 404, corresponding to a user selection of this object. FIG. 4B shows an exemplary response to detection of user input 410-1. In FIG. 4B, display of object 404 is toggled from the first display state (e.g., 404-1, FIG. 4A) to the second display state 404-2. In some embodiments, the second display state for a respective object comprises the full body text of one or more electronic messages of the respective object. In one example object 404 consists of a single email message and the second display state 404-2 displays the full body text of this email message. In some embodiments, displaying the second display state for a respective object includes displaying a field 414 to receive a response (e.g., email reply), as shown in second display state 404-2. In some embodiments, the field 414 is a text field. In some embodiments, the field 414 accommodates more than just text entry, such as input of graphics, links, documents, tables or videos.

FIG. 4B also illustrates an exemplary movement of the other objects in the plurality of objects shown in the electronic message list (e.g., 412, FIG. 4A). In FIG. 4B, in response to detecting user input 410-1 in FIG. 4A, a first subset of objects 413-1 moves vertically upward in the electronic message list panel (e.g., the portion of user interface 400 with a white background). In response to detecting user input 410-1 in FIG. 4A, a second subset of objects 413-2 also moves vertically downward in the electronic message list panel. This movement of the other objects (e.g., the objects that were not selected) in the electronic message list, allows for object 404 to occupy more space, as needed, to display the second display state 404-2. In some embodiments, the amount of space required in the electronic message list to display an object's respective second display state, is determined by the analysis module 170, in FIG. 1. In FIG. 4B, object 404 is kept in-line with the other objects of the plurality of objects, while displayed in the second display state 404-2. In some embodiments, the selected object (i.e., object 404) is not displayed in-line with the other objects in the plurality of objects, while being displayed in any state other than the first display state.

As such, FIGS. 4A and 4B collectively illustrate detecting user selection of a first object 404 of the plurality of objects in the electronic message list panel and, in response to detecting user selection of the first object, toggling display of the first object from a first state 404-1 to a second state 404-2. Further a first subset of objects in the plurality of objects move vertically upward, where the first subset of objects comprises one or more objects above the first object 404 and moving a second subset of objects in the plurality of objects vertically downward, where the second subset of objects comprises one or more objects below the first object 404.

FIG. 4B also shows the selected object (i.e., object 404), displayed slightly wider or larger in the second display state 404-2, than when it was displayed in the first display state 404-1. FIG. 4B also shows object 404 highlighted, or visibly distinguished from the other objects in the plurality of objects in the electronic message list (e.g., bold outline, colored background). In some embodiments, an object displayed in a respective second display state is not resized, highlighted or visibly distinguished from the other objects in the electronic message list. In FIG. 4B, two user inputs are depicted, 410-2 and 410-3. Both of these user inputs illustrate an exemplary type of user input detected outside of the electronic message list. In response to detecting a user input 410-2 or 410-3 outside of the electronic message list, display of object 404 toggles back from the second display state 404-2 to the first display state 404-1, as shown in FIG. 4C. FIG. 4C also shows that the first subset of objects 413-1, moves vertically downward in the electronic message list, and the second subset of objects 413-2, moves vertically upward in the electronic message list. FIG. 4C illustrates another user input 410-4, detected on object 402 displayed in first display state 402-1.

In some embodiments, only one of the first or the second subset of objects moves, when the selected object toggles from one display state to another display state (e.g., if the selected object is at the top or bottom of the electronic message list or user interface). In some embodiments, toggling display of a selected object from one display state to another display state includes repositioning the selected object within the electronic message list or user interface, before toggling the display (e.g., moving the selected object to the middle of the visible part of the user interface, within electronic message panel).

FIG. 4D shows an exemplary response to detecting user input 410-4 on object 402 in FIG. 4C. Responsive to user input 410-4, in FIG. 4D, display of object 402 is toggled from the first display state 402-1 (e.g., in FIG. 4C), to a second display state 402-2. In this example, object 402, is a "cluster" or a group of electronic messages with a collective association. In this case, object 402 comprises nine email messages pertaining to "Promotions." In the exemplary second display state 402-2, a listing of all the email messages in object 402 is displayed. In some embodiments, this listing of the email messages in object 402 resembles the listing of electronic messages in the electronic message list (e.g., 412, FIG. 4A). Here, each email message of object 402 is listed in second display state 402-2 with a subset of the text from the respective email message displayed. For example, email message 416 is displayed in the listing of email messages with a subset of the text from email 416 shown. In some embodiments, the electronic messages of a cluster, or another group of electronic messages, are considered objects as well. In that case, object 416, has a respective first display state 416-1, depicted in the listing of objects in second display state 402-2 of object 402. In some embodiments, each electronic message of object 402 is considered to be displayed in a third display state (e.g., state 416-1).

FIG. 4D also shows a subset of objects above object 402 in the electronic message list (e.g., 412, FIG. 4A) moving vertically upward, and a subset of objects below object 402 in the electronic message list moving vertically downward. This allows object 402 to be displayed on the user interface 400, in the second display state 402-2. In FIG. 4D, all of second display state 402-2 fits on the visible portion of user interface 400, but in some embodiments, a portion of second display state 402-2 cannot be displayed within the visible portion of user interface 400. This exemplary second display state 402-2, is displayed wider, larger and visually highlighted, with respect to the other objects in the electronic message list (e.g., 412, FIG. 4A), but this is only one possible embodiment for second display state 402-2. FIG. 4D shows another user input 410-5, detected on object 416.

FIG. 4E shows the exemplary response to detecting user input 410-5 on object 416 in FIG. 4D. In FIG. 4E, object 416 is shown in its respective second display state 416-2. Here, second display state 402-2 of object 402 and second display state 416-2 of object 416 are concurrently shown. The second display state 416-2 of object 416, displays the full body text of the single email message corresponding to object 416. In some embodiments, displaying the second display state for a respective object of a respective cluster includes displaying a text field 414 to receive a response (e.g., email reply), as shown in second display state 416-2. In some embodiments, the first display state 416-1 and second display state 416-2 of object 416 are considered a third display state and a fourth display state, respectively, of object 402.

FIG. 4E also shows an exemplary movement of other objects in the electronic message list (e.g., 412, FIG. 4A) and in the email cluster corresponding to object 402, in response to detecting user input 410-5 (FIG. 4D) on object 402. In some embodiments, objects from the electronic message list, along with objects from second display state of a cluster (e.g., 402-2), above the selected object in the cluster (e.g., object 416), move vertically upward. Similarly, in some embodiments, objects from the electronic message list, along with objects from second display state of a cluster (e.g., 402-2), below the selected object in the cluster (e.g., object 416), move vertically downward. In some embodiments, toggling display of object 416 from first display state 416-1 to second display state 416-2 includes displaying second display state 416-2 overlapped over second display state 402-2.

FIG. 4E also shows two user inputs 410-6 and 410-7. In some embodiments, detecting user input 410-6 on a portion of second display state 402-2 of object 402 results in toggling display of object 416 back from second display state 416-2 to first display state 416-1, and correspondingly moving objects above and below object 416 back to their relative positions to first display state 416-1. This is effectively shown in FIG. 4F.

In some embodiments, detecting user input 410-7 on a portion of the user interface 400 outside of the electronic message list panel (e.g., the portion of 400 with a white background), also reverts display of the various objects of object 402 and the electronic message list to the one effectively shown in FIG. 4F. In some embodiments, in response to detecting user input 410-7, the display of objects reverts to showing the electronic message list 412 in FIG. 4A, including display of object 402 in first display state 402-1.

FIG. 4F, illustrates several user inputs, 410-8, 410-9 and 410-10 that can be detected to trigger toggling display of object 402 from second display state 402-2, back to first display state 402-1, as shown in FIG. 4G. User inputs 410-8, 410-9 and 410-10 are detected on various locations on user interface 400, none of which correspond to a location of an object displayed in a first state. In some embodiments, a user input detected on an object displayed in a first state, in FIG. 4F, toggles display of the selected object from a respective first display state to a respective second display state. In some embodiments, detecting a user input on an object displayed in a first state toggles display of object 402 from second display state 402-2 to first display state 402-1 (i.e., reverts to the display shown in FIG. 4A).

FIG. 4G also shows a user input 410-11 detected on object 402, displayed in first display state 402-1. FIG. 4H illustrates another exemplary representation of a second display state 402-2 for object 402, showing the second display state 402-2 overlapped over the electronic message list (e.g., 412, FIG. 4A). FIG. 4H shows a user input 410-12, detected on object 416, of the plurality of email messages in object 402, displayed in first display state 416-1. In some embodiments, this user input toggles the display of object 416 from first display state 416-1 to second display state 416-2, as shown in FIG. 4I. In FIG. 4I, while second display state 402-2 still overlaps over some of the electronic messages in the electronic message list (e.g., 412, FIG. 4A), in some embodiments, toggling display of object 416 from its respective first display state 416-1 to its respective second display state 416-2 moves at least a subset of objects above it vertically upward, and at least a subset of objects below it, vertically downward.

FIG. 4J shows composition of a reply message to the single email message of object 404, although similar actions can be observed in an object comprising more than one electronic message (e.g., an object comprising several email messages). The reply message is being composed in field 414, and object 404 is displayed in a second display state 404-2, providing a text field for the reply message to be composed. FIG. 4J also shows the first subset of objects 413-1, and second subset of objects 413-2, described earlier in FIGS. 4B and 4C.

FIG. 4K illustrates a dynamic response in user interface 400, to a reply message in field 414, which is getting longer as a user types a message and requires more space to display. First subset of objects 413-1 moves vertically upward and second subset of objects 413-2 moves vertically downward, to provide object 404 with more room in the electronic message list panel to display text in field 414. In some embodiments, as the size of the reply typed into field 414 increases, object 404 is also repositioned to be vertically centered at the center of the visible portion of user interface 400 (or some other predetermined position of the visible portion of the user interface 400). FIG. 4L illustrates a reply that has become so lengthy that all other objects of the plurality of objects have been moved off of the visible portion of user interface 400 and yet the reply remains centered.

FIG. 4M illustrates an exemplary alternative form of displaying a lengthy reply in field 414. In FIG. 4M, object 404, in second display state 404-2, and field 414 each grows to a respective, predefined size despite the growing amount of text being entered into field 414. In FIG. 4M, as the amount of text in field 414 exceeds the amount that can be displayed in the predefined maximum size of field 414, only the most recent text entered into field 414 is displayed, while the remaining text is scrolled up and out of visibility. User input 410-13 indicates a scrolling action detected over field 414, in order to view the text that was scrolled up and obscured from view. For example, FIG. 4N shows the result of user input 410-13 corresponding to a scrolling motion to view the text at the top of the reply message in field 414. FIG. 4N also shows an example of how a scrolling user input 410-14 can be detected anywhere on the electronic message list panel (e.g., portion of user interface 400 with a white background), and it will result in the plurality of objects in the electronic message list moving up or down, as shown in FIG. 4O.

Scrolling or moving the electronic message list is not limited to the embodiments shown in FIGS. 4M, 4N and 4O. In some embodiments, the electronic message list is scrolled while a selected object is displayed in its respective second display state. In some embodiments, scrolling the selected object out of view on the user interface toggles the display state of the selected object from its respective second state to its first state, such that the object will be displayed in its first display state when the list is scrolled back to display the object in the user interface. In other embodiments, scrolling the selected object out of view on the user interface does not toggle the display state of the selected object.

FIG. 4O shows user input 410-15 detected on object 408, displayed in first display state 408-1. FIG. 4P illustrates the display of object 408 toggled from first display state 408-1 in FIG. 4O, to second display state 408-2. In some embodiments, when an object is in a second display state (e.g., object 404 in second display state 404-2 in FIG. 4O), detecting a user input on another object in the plurality of objects (e.g., user input 410-15 on object 408, in FIG. 4O), toggles display of the object in the second display state back to a first display state, and toggles display of the selected object from its respective first display state to its respective second display state (e.g., as shown in FIGS. 4O and 4P). In some embodiments, when an object is in a second display state (e.g., object 404 in second display state 404-2 in FIG. 4O), detecting a user input on another object in the plurality of objects, or anywhere on user interface 400, or within the electronic message list panel, will only toggle display of the object in the second display state back to a first display state.

FIG. 4P illustrates an exemplary object 408, comprising more than one email message having a collective association. In some embodiments, object 408 can be referred to as an email conversation or email thread. FIG. 4P illustrates an exemplary second display state 408-2, where some of the contents of object 408 (i.e., email messages), are obscured or represented by text or an image to indicate the number of emails in the object that are not displayed. The second display state of object 408 could, alternatively, list all the emails in the email conversation, in a listing, or display the full content of each email in the thread. The display format of second display state 408-2 changes as the nature of object 408 changes. If object 408 initially comprises a small number of email messages, it may not have to obscure any emails, as shown in FIG. 4P. If object 408 eventually comprises a large number of email messages, it may have a second display state like second display state 408-2. Any of several factors, or combinations thereof, contribute to the determination of how to display object 408 (and other objects) in its various display states, such as the importance of the email conversation, the size of the user interface 400, what device is being used to view the electronic messages, how many other objects are shown in user interface 400 and the length of each email of the plurality of emails in object 408.

FIG. 4Q illustrates an exemplary response to detecting user input 410-16 in FIG. 4P, on the portion of second display state 408-2, that describes the obscured contents of object 408 (i.e., 3 more messages). In exemplary third display state 408-3, a list of all the emails in the email conversation is displayed, along with a subset of the text for each respective email of the plurality of emails in object 408. In some embodiments, each email of the plurality of emails in object 408 can be considered to be displayed in a respective first display state, as well.

FIG. 4R illustrates an exemplary response to detecting user input 410-17 in FIG. 4Q, on one of the emails of the plurality of emails in object 408. FIG. 4R illustrates a fourth display state 408-4 for object 408, displaying the full content of the selected email in the plurality of emails. In some embodiments, the selected email can be considered to be displayed in a respective second display state, as well.

FIGS. 5A to 5E are exemplary flow charts illustrating a method 500 for displaying electronic messages, in accordance with some implementations.

Figure 5A:
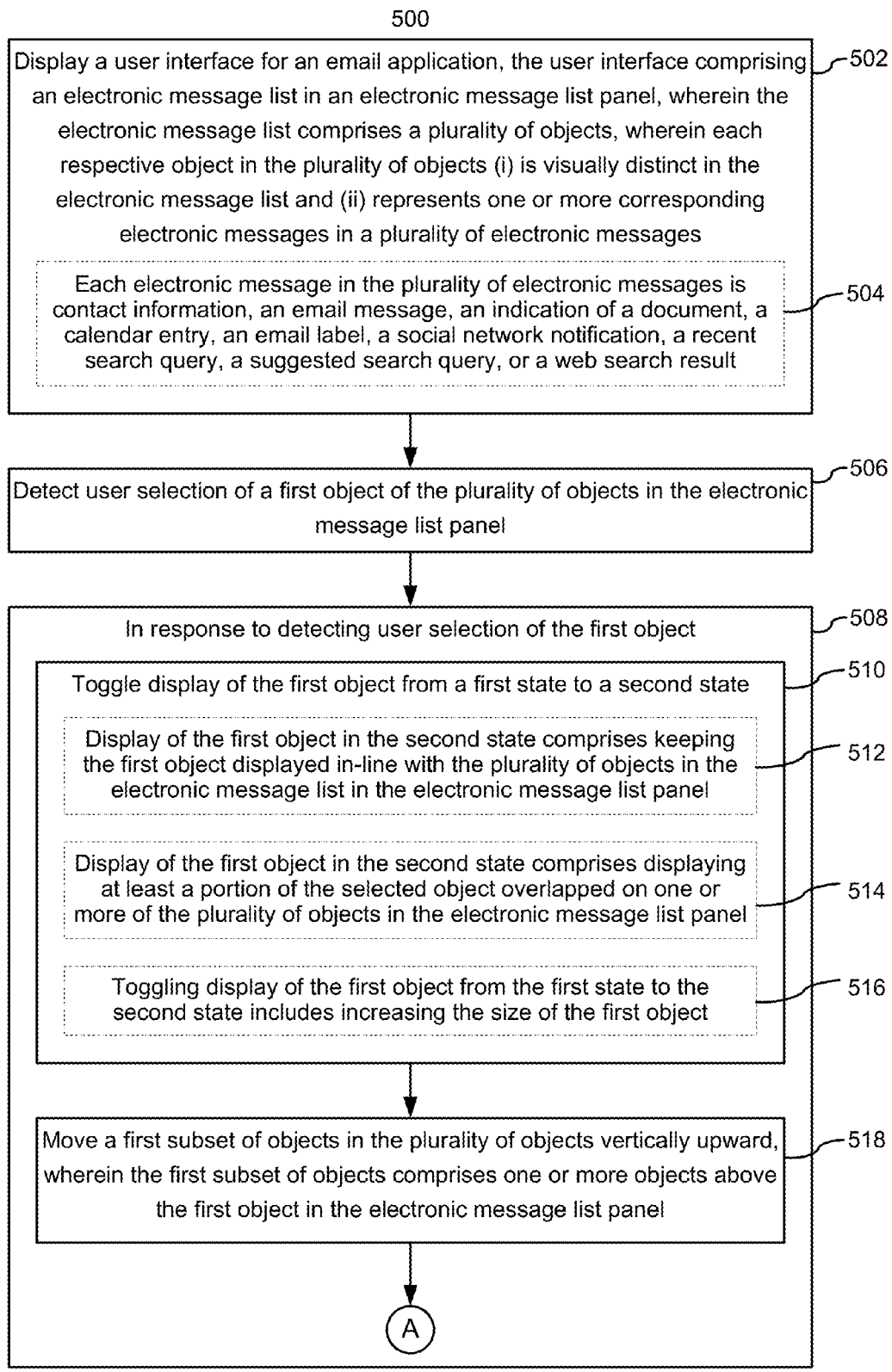
FIGS. 5A-5E are exemplary flow charts illustrating methods for displaying electronic messages, in accordance with some implementations.
Figure 5B:
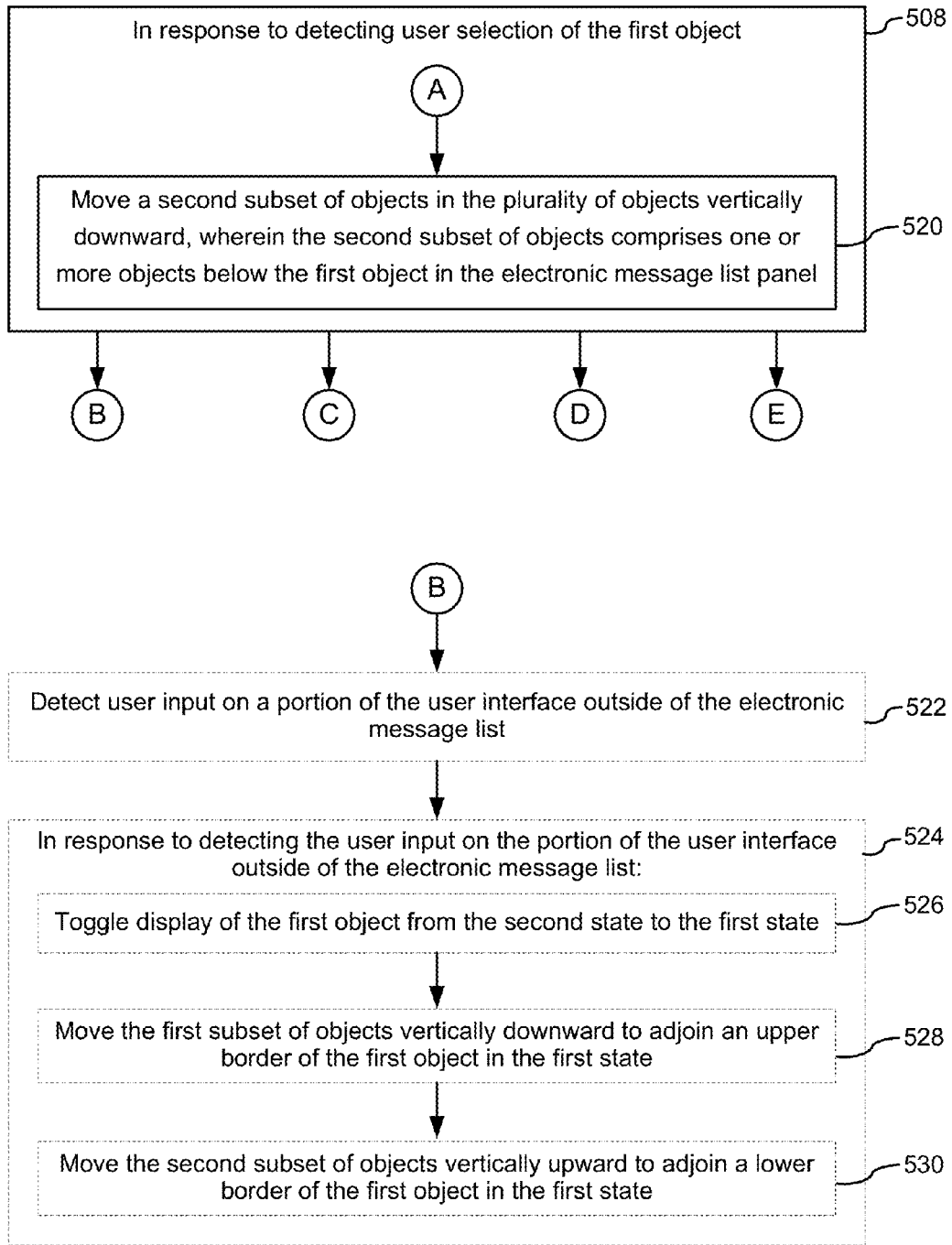
Figure 5C:
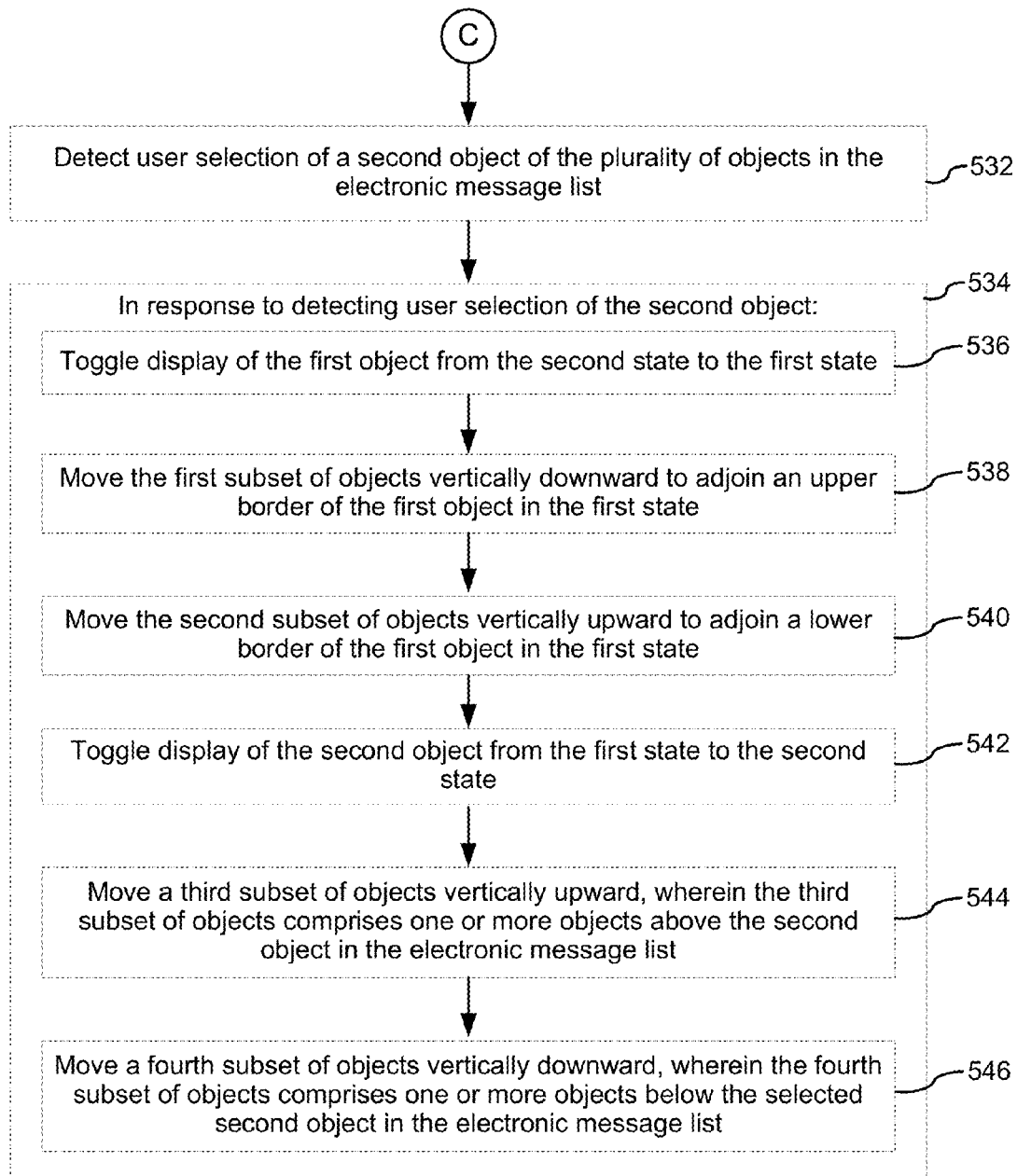
Figure 5D:
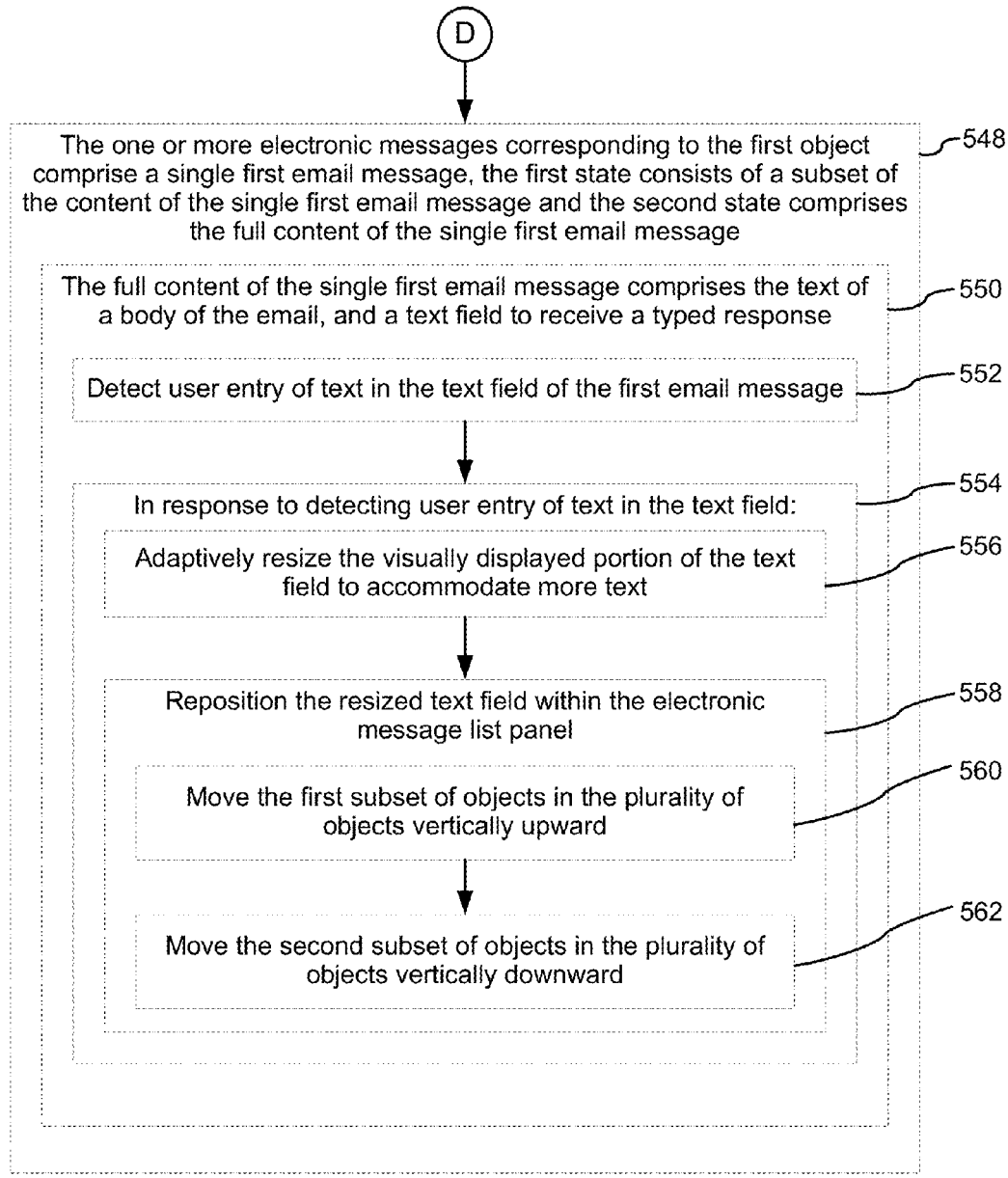
Figure 5E:
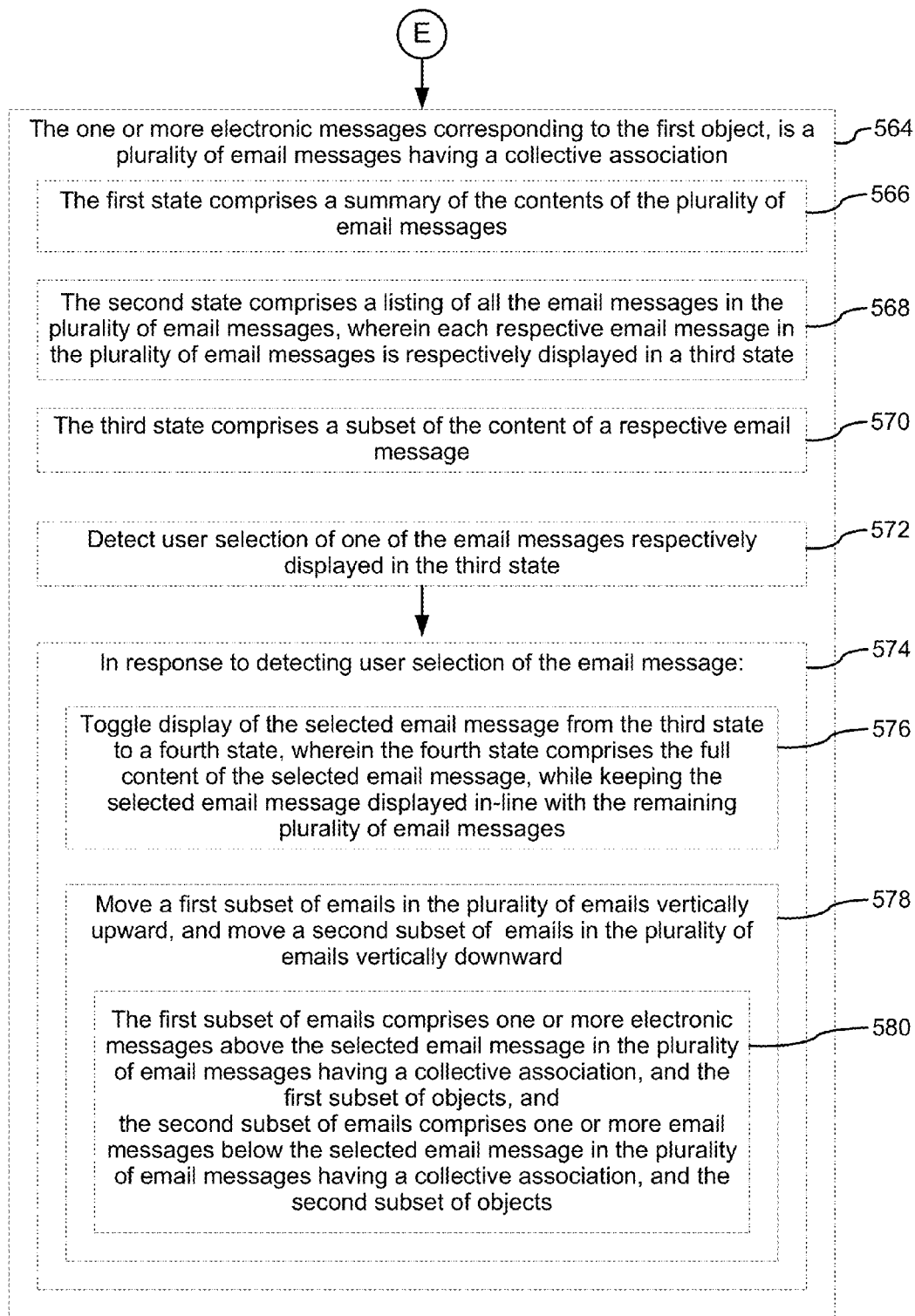

FIG. 5A illustrates a flow chart for method 500, performed in some embodiments, at a computing device having one or more processors, a display and memory storing one or more programs for execution by the one or more processors. The method includes displaying (502) a user interface for a messaging application, the user interface comprising an electronic message list in an electronic message list panel, where the electronic message list comprises a plurality of objects and where each respective object in the plurality of objects is visually distinct in the electronic message list and represents one or more corresponding electronic messages in a plurality of electronic messages. For example, user interface 400 in FIG. 4A, comprising electronic message list 412, comprising objects 402, 404 and 408 in FIG. 4A.

In some embodiments, each electronic message in the plurality of electronic messages is (504) contact information, an email message, an indication of a document, a calendar entry, an email label, a social network notification, a recent search query, a suggested search query, or a web search result.

The method includes, detecting (506) user selection of a first object of the plurality of objects in the electronic message list panel (e.g., user input 410-1 in FIG. 4A). The method includes, in response to detecting user selection of the first object (508), toggling (510) display of the first object from a first state to a second state. For example, toggling display of object 404 from first display state 404-1 in FIG. 4A to second display state 404-2 in FIG. 4B.

In some embodiments, display of the first object in the second state comprises (512) keeping the first object displayed in-line with the plurality of objects in the electronic message list in the electronic message list panel (e.g., object 404 in second display state 404-2 in FIG. 4B). In some embodiments, display of the first object in the second state comprises (514) displaying at least a portion of the selected object overlapped on one or more of the plurality of objects in the electronic message list panel (e.g., object 402 in second display state 402-2 in FIG. 4H). In some embodiments, toggling (516) display of the first object from the first state to the second state includes increasing the size of the first object (e.g., object 404 in second display state 404-2 in FIG. 4B).

The method further includes moving (518) a first subset of objects in the plurality of objects vertically upward, where the first subset of objects comprises one or more objects above the first object in the electronic message list panel (e.g., subset 413-1 in FIG. 4B). The method further includes moving (520)

a second subset of objects in the plurality of objects vertically downward, where the second subset of objects comprises one or more objects below the first object in the electronic message list panel (e.g., subset 413-2 in FIG. 4B).

In some embodiments, the method further includes detecting (522) user input on a portion of the user interface outside of the electronic message list (e.g., user input 410-2 in FIG. 4B). In some embodiments, the method includes, in response to detecting the user input on the portion of the user interface outside of the electronic message list (524), toggling (526) display of the first object from the second state to the first state, moving (528) the first subset of objects vertically downward to adjoin an upper border of the first object in the first state and moving (530) the second subset of objects vertically upward to adjoin a lower border of the first object in the first state. For example, in FIG. 4B, object 404 is displayed in second display state 404-2. In response to detecting user input 410-2, display of object 404 is toggled from state 404-2 to state 404-1 in FIG. 4C. The subset of objects 413-1 moves vertically downward, from FIG. 4B to FIG. 4C, so that they adjoin upper border 440 of object 404. Further the subset of objects 413-2 moves vertically upward, from FIG. 4B to FIG. 4C, so that they adjoin lower border 460 of object 404.

In some embodiments, the method further includes detecting (532) user selection of a second object of the plurality of objects in the electronic message list (e.g., user input 410-15 on object 408, in FIG. 4O). In some embodiments, the method includes, in response to detecting user selection of the second object (534), toggling (536) display of the first object from the second state to the first state, moving (538) the first subset of objects vertically downward to adjoin an upper border of the first object in the first state and moving (540) the second subset of objects vertically upward to adjoin a lower border of the first object in the first state. In these embodiments, the method further includes toggling (542) display of the second object from the first state to the second state, moving (544) a third subset of objects vertically upward, where the third subset of objects comprises one or more objects above the second object in the electronic message list, and moving (546) a fourth subset of objects vertically downward, wherein the fourth subset of objects comprises one or more objects below the selected second object in the electronic message list. For example, in FIG. 4O user input 410-15 is detected on object 408, and in FIG. 4P, object 408 toggles from being displayed in state 408-1 to state 408-2, and object 404 toggles from being displayed in state 404-2 to state 404-1.

In some embodiments, the one or more electronic messages corresponding to the first object comprises a single first email message (548), the first state consists of a subset of the content of the single first email message and the second state comprises the full content of the single first email message (e.g., object 404 in FIGS. 4A and 4B). In some embodiments, the full content of the single first email message comprises (550) the text of a body of the email, and a text field to receive a typed response (e.g., object 404 in FIG. 4B, having field 414 in state 404-2). In some embodiments, the method includes detecting (552) user entry of text in the text field of the first email message (e.g., entry of text in field 414 in FIG. 4J). In some embodiments, the method includes, in response to detecting user entry of text in the text field (554), adaptively resizing (556) the visually displayed portion of the text field to accommodate more text (e.g., text field 414 in FIG. 4K) and repositioning (558) the resized text field within the electronic message list panel (e.g., as shown in FIG. 4K and FIG. 4L). In some embodiments, repositioning the resized text field comprises moving (560) the first subset of objects in the plurality of objects vertically upward and moving (562) the second subset of objects in the plurality of objects vertically downward (e.g., subsets 413-1 and 413-2 in FIGS. 4J and 4K).

In some embodiments, the one or more electronic messages corresponding to the first object, is a plurality of email messages having a collective association (564), and the first state comprises (566) a summary of the contents of the plurality of email messages, the second state comprises (568) a listing of all the email messages in the plurality of email messages, where each respective email message in the plurality of email messages is respectively displayed in a third state, and the third state comprises a subset of the content of a respective email message (570). For example, object 402 in FIG. 4C or object 408 in FIG. 4O represent a plurality of email messages having a collective association. In the case of object 402, the first state, 402-1 comprises a summary of the contents of the plurality of email messages (e.g., showing a subset of the senders of the 9 promotional emails). In FIG. 4D, the second state of object 402, state 402-2 comprises a listing of the email messages in the plurality of email messages. Each email in FIG. 4D is respectively displayed in a third state, comprising a subset of the content of the respective email message (e.g., "Full of vitamins" in object 416).

In some embodiments, the method further includes detecting (572) user selection of one of the email messages respectively displayed in the third state (e.g., user input 410-5 on object 416 in FIG. 4D). In some embodiments, the method includes, in response to detecting user selection of the email message (574), toggling (576) display of the selected email message from the third state to a fourth state, where the fourth state comprises the full content of the selected email message, while keeping the selected email message displayed in-line with the remaining plurality of email messages (e.g., toggling from state 416-1 in FIG. 4D to state 416-2 in FIG. 4E). In some embodiments, the method includes moving (578) a first subset of emails in the plurality of emails vertically upward, and moving a second subset of emails in the plurality of emails vertically downward. In some embodiments, the first subset of emails comprises (580) one or more electronic messages above the selected email message in the plurality of email messages having a collective association, and the first subset of objects, and the second subset of emails comprises one or more email messages below the selected email message in the plurality of email messages having a collective association, and the second subset of objects. For example, in FIG. 4E, object 416 is displayed in state 416-2. In order to make space in the electronic message list, objects from the electronic message list are moved (e.g., object 408 in FIG. 4E), as well as email messages in the plurality of email messages shown in object 402, displayed in state 402-2 in FIG. 4E.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms.

These terms are only used to distinguish one element from another. For example, a first object could be termed a second object, and, similarly, a second object could be termed a first object, without changing the meaning of the description, so long as all occurrences of the "first object" are renamed consistently and all occurrences of the "second object" are renamed consistently. The first object and the second object are both objects, but they are not the same object.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail. The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method comprising:
at a computing device having one or more processors, a display and memory storing one or more programs for execution by the one or more processors:
displaying a user interface for a messaging application, the user interface comprising an electronic message list in an electronic message list panel having a boundary, wherein the electronic message list comprises a plurality of objects and each respective object in the plurality of objects (i) is visually distinct in the electronic message list and (ii) represents one or more corresponding electronic messages in a plurality of electronic messages;

detecting user selection of a first object of the plurality of objects in the electronic message list panel, wherein the first object represents a first plurality of email messages; and in response to detecting user selection of the first object:
toggling display of the first object from a first display state in the electronic message list panel to a second display state in the electronic message list panel, while keeping the first object displayed in-line with the plurality of objects in the electronic message list in the electronic message list panel, wherein the second display state of the first object replaces the first display state of the first object, the first display state of the first object comprises a single summary of contents of the first plurality of email messages, the second display state of the first object comprises a listing of the email messages in the first plurality of email messages, and each email message in the listing is displayed in a third display state comprising a subset of a message body of the email message;

moving a first subset of objects in the plurality of objects vertically upward, wherein the first subset of objects comprises one or more objects above the first object in the electronic message list panel and wherein the moving the first subset causes all or a portion of at least one object in the first subset of objects to move outside the boundary of the electronic message list panel and to no longer be displayed; and moving a second subset of objects in the plurality of objects vertically downward, wherein the second subset of objects comprises one or more objects below the first object in the electronic message list panel and wherein the moving the second subset causes all or a portion of at least one object in the second subset of objects to move outside the boundary of the electronic message list panel and to no longer be displayed;

detecting user selection of a first email message displayed in the third display state; and in response to detecting user selection of the first email message:
toggling display of the first email message from the third display state in the electronic message list panel to a fourth display state in the electronic message list panel, wherein the fourth display state comprises all of the message body of the first email message, while keeping the first email message displayed in-line with the remaining plurality of email messages.

2. The method of claim 1, wherein display of the first object in the second display state comprises keeping the first object displayed in-line with the plurality of objects in the electronic message list in the electronic message list panel.

3. The method of claim 1, wherein display of the first object in the second display state comprises displaying at least a portion of the selected object overlapped on one or more of the plurality of objects in the electronic message list panel.

4. The method of claim 1, wherein toggling display of the first object from the first display state to the second display state includes increasing the size of the first object.

5. The method of claim 1, further comprising:
   detecting user input on a portion of the user interface outside of the electronic message list;
   in response to detecting the user input on the portion of the user interface outside of the electronic message list:
      toggling display of the first object from the second display state to the first display state, wherein the second display state replaces the first display state;
      moving the first subset of objects vertically downward to adjoin an upper border of the first object in the first display state; and
      moving the second subset of objects vertically upward to adjoin a lower border of the first object in the first display state.

6. The method of claim 1, further comprising:
   detecting user selection of a second object of the plurality of objects in the electronic message list at a time when the first object is in the second display state and all other objects in the plurality of objects are in the first display state;
   in response to detecting user selection of the second object:
      toggling display of the first object from the second display state to the first display state, wherein the second display state of the first object replaces the first display state of the first object;
      moving the first subset of objects vertically downward to adjoin an upper border of the first object in the first display state;
      moving the second subset of objects vertically upward to adjoin a lower border of the first object in the first display state;
      toggling display of the second object from the first display state to the second display state, wherein the second display state of the second object replaces the first display state of the first object;
      moving a third subset of objects vertically upward to adjoin an upper border of the second object in the second display state, wherein the third subset of objects comprises one or more objects above the second object in the electronic message list; and
      moving a fourth subset of objects vertically downward to adjoin a lower border of the second object in the second display state, wherein the fourth subset of objects comprises one or more objects below the selected second object in the electronic message list.

7. The method of claim 1, wherein the fourth display state of the first email message further comprises a text field to receive a typed response.

8. The method of claim 7, further comprising:
   detecting user entry of text in the text field;
   in response to detecting user entry of text in the text field:
      adaptively resizing the visually displayed portion of the text field to accommodate more text; and
      repositioning the resized text field within the electronic message list panel.

9. The method of claim 8, wherein repositioning the resized text field within the electronic message list panel comprises:
   moving the first subset of objects in the plurality of objects vertically upward; and
   moving the second subset of objects in the plurality of objects vertically downward.

10. The method of claim 1, wherein the first plurality of email messages has a collective association.

11. The method of claim 1, further comprising
    in response to detecting user selection of the first email message:
       moving a first subset of emails in the plurality of emails vertically upward; and
       moving a second subset of emails in the plurality of emails vertically downward.

12. The method of claim 11, wherein
    the first subset of emails comprises one or more electronic messages above the selected email message in the plurality of email messages; and
    the second subset of emails comprises one or more email messages below the selected email message in the plurality of email messages.

13. The method of claim 1, wherein each electronic message in the plurality of electronic messages is contact information, an email message, an indication of a document, a calendar entry, an email label, a social network notification, a recent search query, a suggested search query, or a web search result.

14. A computing system, comprising:
    one or more processors;
    memory; and
    one or more programs, wherein the one or more programs are stored in the memory and are configured to be executed by the one or more processors, the one or more programs including instructions for:
       displaying a user interface for a messaging application, the user interface comprising an electronic message list in an electronic message list panel having a boundary, wherein the electronic message list comprises a plurality of objects, wherein each respective object in the plurality of objects (i) is visually distinct in the electronic message list and (ii) represents one or more corresponding electronic messages in a plurality of electronic messages;
       detecting user selection of a first object of the plurality of objects in the electronic message list panel, wherein the first object represents a first plurality of email messages;
       in response to detecting user selection of the first object:
          toggling display of the first object from a first display state in the electronic message list panel to a second display state in the electronic message list panel, while keeping the first object displayed in-line with the plurality of objects in the electronic message list in the electronic message list panel, wherein the second display state of the first object replaces the first display state of the first object, the first display state of the first object comprises a single summary of contents of the first plurality of email messages, the second display state of the first object comprises a listing of the email messages in the first plurality of email messages, and each email message in the listing is displayed in a third display state comprising a subset of a message body of the email message;
          moving a first subset of objects in the plurality of objects vertically upward, wherein the first subset of objects comprises one or more objects above the first object in the electronic message list panel and wherein the moving the first subset causes all or a portion of at least one object in the first subset of objects to move outside the boundary of the electronic message list panel and to no longer be displayed; and moving a second subset of objects in the plurality of objects vertically downward, wherein the second subset of objects comprises one or more objects below the first object in the electronic message list panel and wherein the moving the second subset causes all or a portion of at least one object in the second subset of objects to move outside the boundary of the electronic message list panel and to no longer be displayed;

detecting user selection of a first email message displayed in the third display state; and in response to detecting user selection of the first email message:

toggling display of the selected email message from the third display state in the electronic message list panel to a fourth display state in the electronic message list panel, wherein the fourth display state comprises all of the message body of the first email message, while keeping the first email message displayed in-line with the remaining plurality of email messages.

15. The system of claim 14, wherein display of the first object in the second display state comprises keeping the first object displayed in-line with the plurality of objects in the electronic message list in the electronic message list panel.

16. A non-transitory computer readable storage medium storing one or more programs, the one or more programs comprising instructions, which when executed by a computing system with one or more processors, cause the computing system to execute a method of:

displaying a user interface for a messaging application, the user interface comprising an electronic message list in an electronic message list panel having a boundary, wherein the electronic message list comprises a plurality of objects, wherein each respective object in the plurality of objects (i) is visually distinct in the electronic message list and (ii) represents one or more corresponding electronic messages in a plurality of electronic messages;

detecting user selection of a first object of the plurality of objects in the electronic message list panel, wherein the first object represents a first plurality of email messages;

in response to detecting user selection of the first object:

toggling display of the first object from a first display state in the electronic message list panel to a second display state in the electronic message list panel, while keeping the first object displayed in-line with the plurality of objects in the electronic message list in the electronic message list panel, wherein the second display state of the first object replaces the first display state of the first object the first display state of the first object comprises a single summary of contents of the first plurality of email messages, the second display state of the first object comprises a listing of the email messages in the first plurality of email messages, and each email message in the listing is displayed in a third display state comprising a subset of a message body of the email message;

moving a first subset of objects in the plurality of objects vertically upward, wherein the first subset of objects comprises one or more objects above the first object in the electronic message list panel and wherein the moving the first subset causes all or a portion of at least one object in the first subset of objects to move outside the boundary of the electronic message list panel and to no longer be displayed; and moving a second subset of objects in the plurality of objects vertically downward, wherein the second subset of objects comprises one or more objects below the first object in the electronic message list panel and wherein the moving the second subset causes all or a portion of at least one object in the second subset of objects to move outside the boundary of the electronic message list panel and to no longer be displayed;

detecting user selection of a first email messages displayed in the third display state; and in response to detecting user selection of the first email message:

toggling display of the first email message from the third display state in the electronic message list panel to a fourth display state in the electronic message list panel, wherein the fourth display state comprises all of the message body of the first email message, while keeping the first email message displayed in-line with the remaining plurality of email messages.

17. The non-transitory computer readable storage medium of claim 16, wherein display of the first object in the second display state comprises keeping the first object displayed in-line with the plurality of objects in the electronic message list in the electronic message list panel.

* * * * *